United States Patent [19]
Bishel et al.

[11] Patent Number: 5,872,832
[45] Date of Patent: Feb. 16, 1999

[54] TELEPHONE-CONTROLLED ELECTRICAL SWITCH

[76] Inventors: Richard A. Bishel, 16020 NW. Ridgetop La., Beaverton, Oreg. 97006; Patrick D. Hoyle, 751 Cain Lake Rd., Sedro Woolley, Wash. 98284

[21] Appl. No.: 358,338

[22] Filed: Dec. 14, 1994

[51] Int. Cl.⁶ .................................................. H04M 11/00
[52] U.S. Cl. ........................... 379/39; 379/37; 379/386; 379/396; 340/332
[58] Field of Search .................................. 379/37, 38, 39, 379/40, 45, 46, 396, 386, 104, 105, 354; 340/332, 333, 331

[56] References Cited

U.S. PATENT DOCUMENTS

| | | | |
|---|---|---|---|
| 4,556,863 | 12/1985 | Devitt | 340/81 R |
| 4,730,184 | 3/1988 | Bach | 340/691 |
| 4,878,236 | 10/1989 | Ray et al. | 379/37 |
| 4,931,780 | 6/1990 | LaMont et al. | 340/691 |
| 4,935,951 | 6/1990 | Robinson et al. | 379/37 |
| 4,993,058 | 2/1991 | McMinn et al. | 379/37 |
| 5,012,507 | 4/1991 | Leighton et al. | 379/37 |

*Primary Examiner*—Stella Woo
*Attorney, Agent, or Firm*—Todd N. Hathaway

[57] ABSTRACT

A telephone operated electrical switch for selectively energizing an electrical load in response to dialing of a predetermined telephone number. The electrical load may be the exterior light fixture of a dwelling, and the switch assembly may be configured to automatically flash the light on and off in response to the occupant dialing "9-1-1", so as to assist emergency response personnel in locating the dwelling.

31 Claims, 13 Drawing Sheets

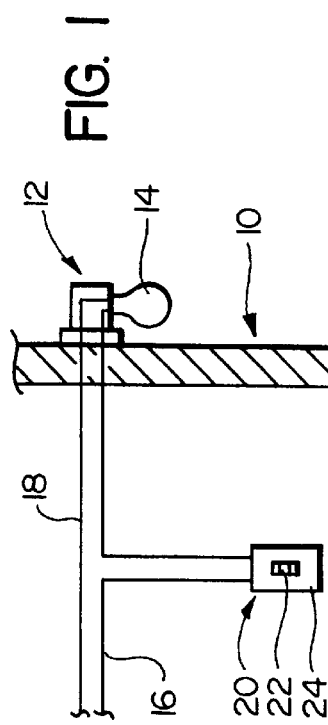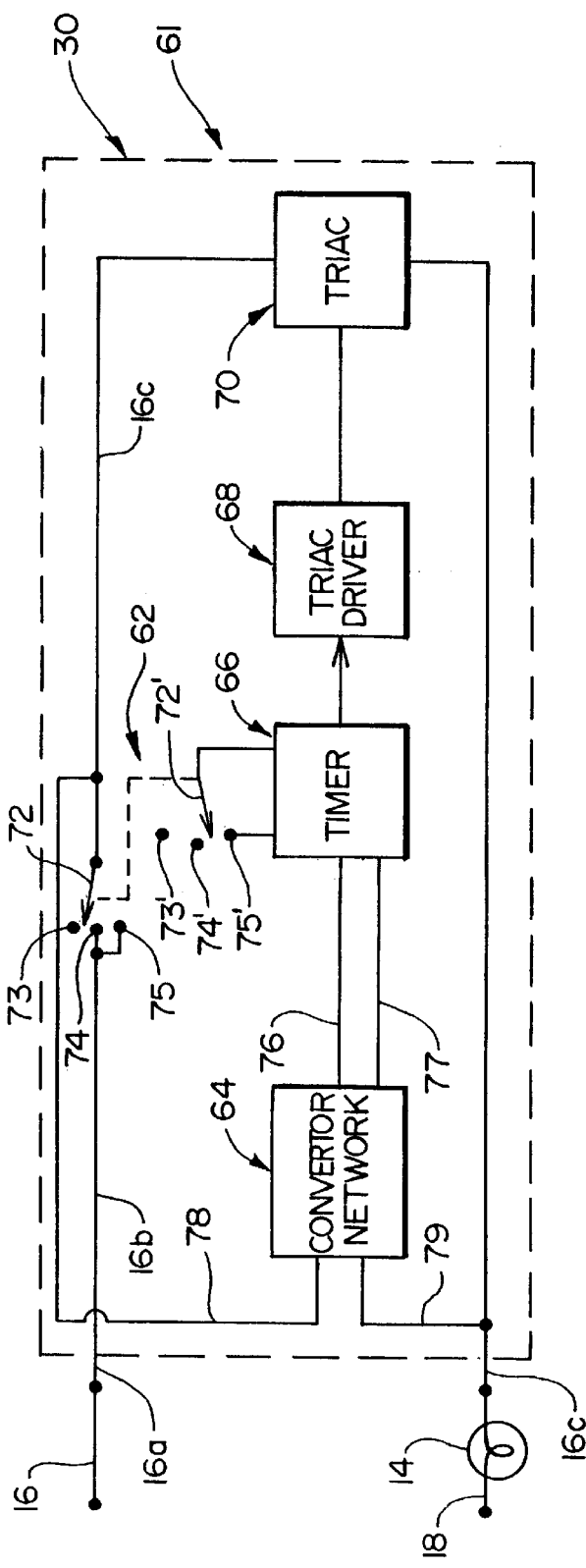

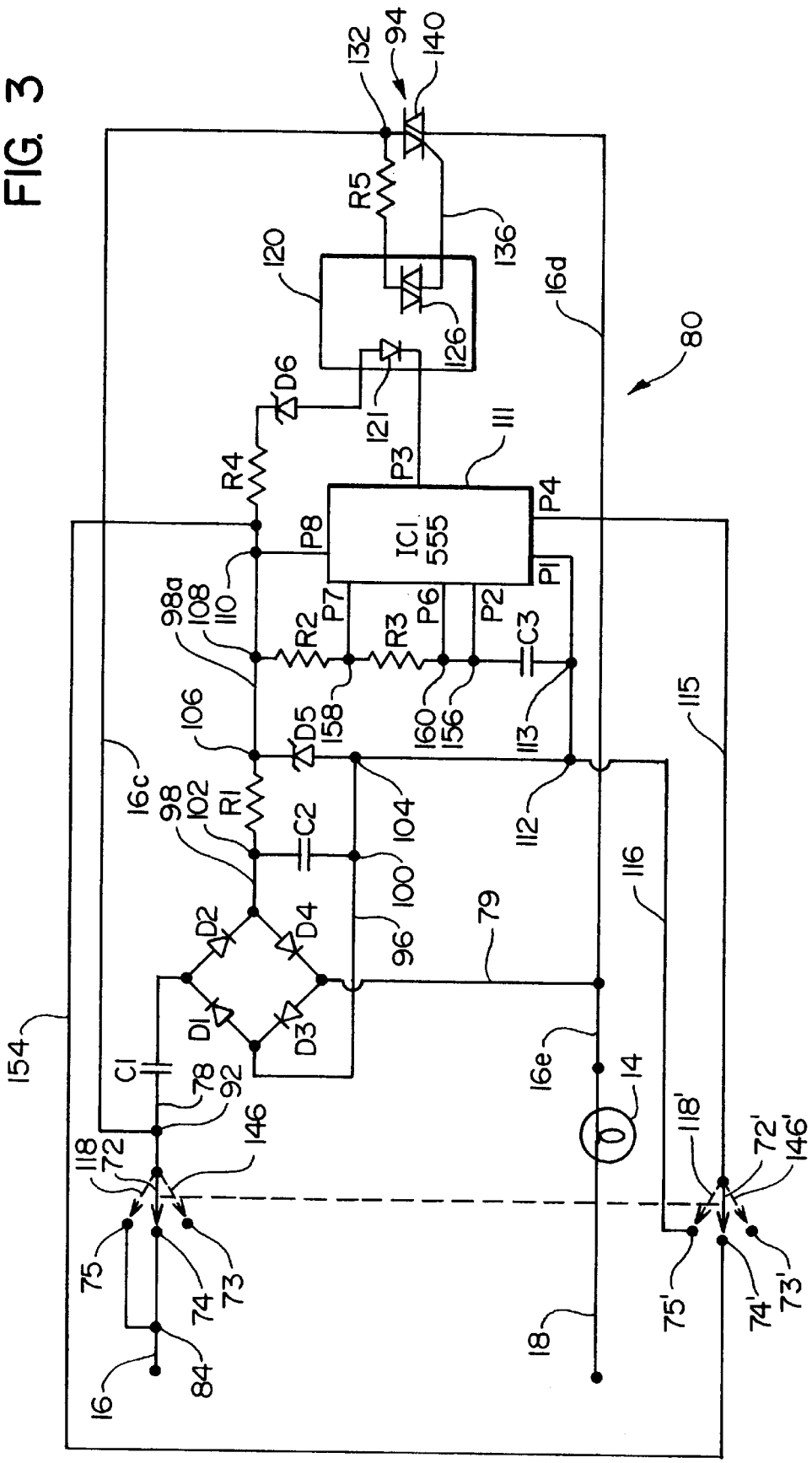

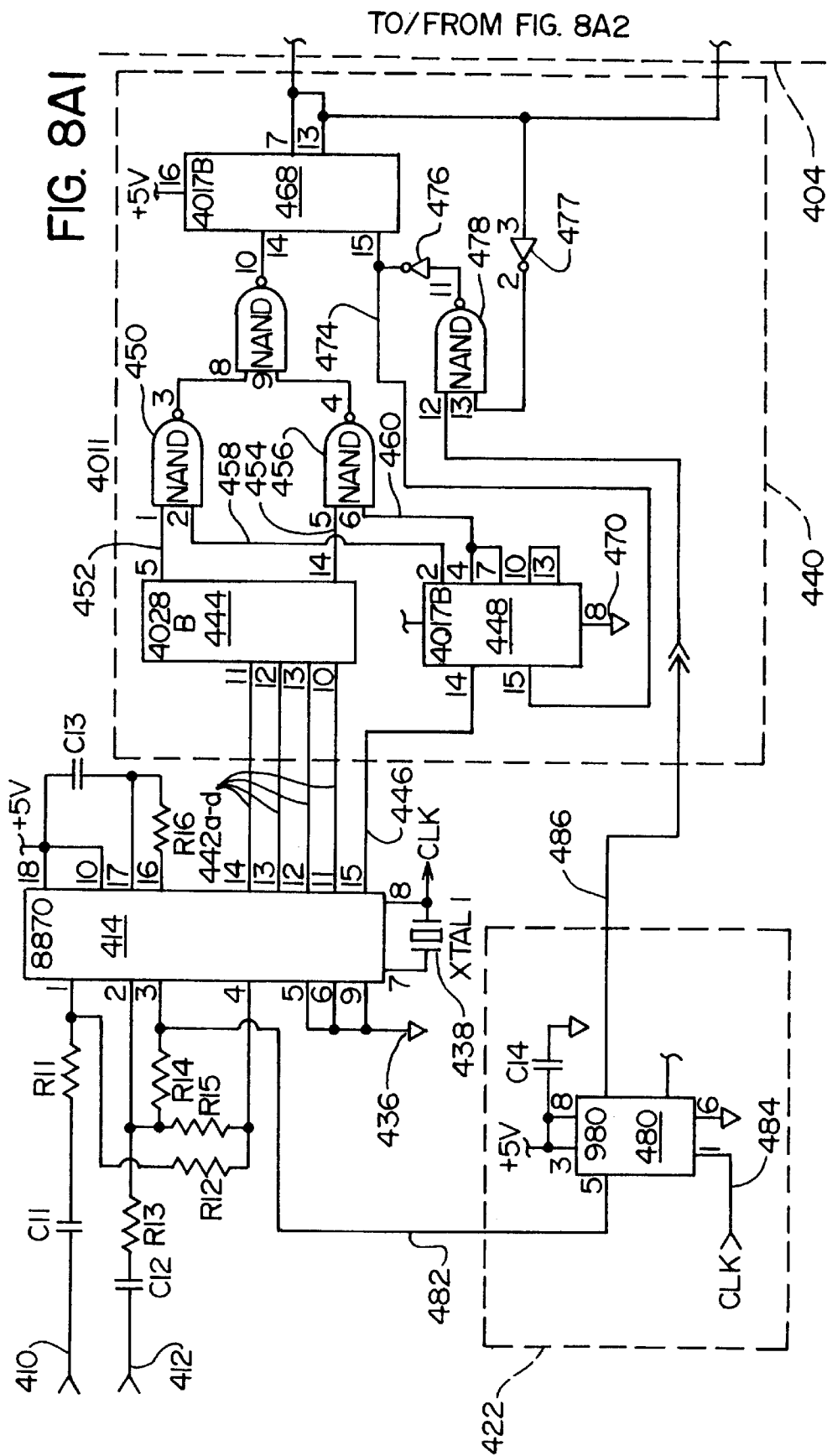

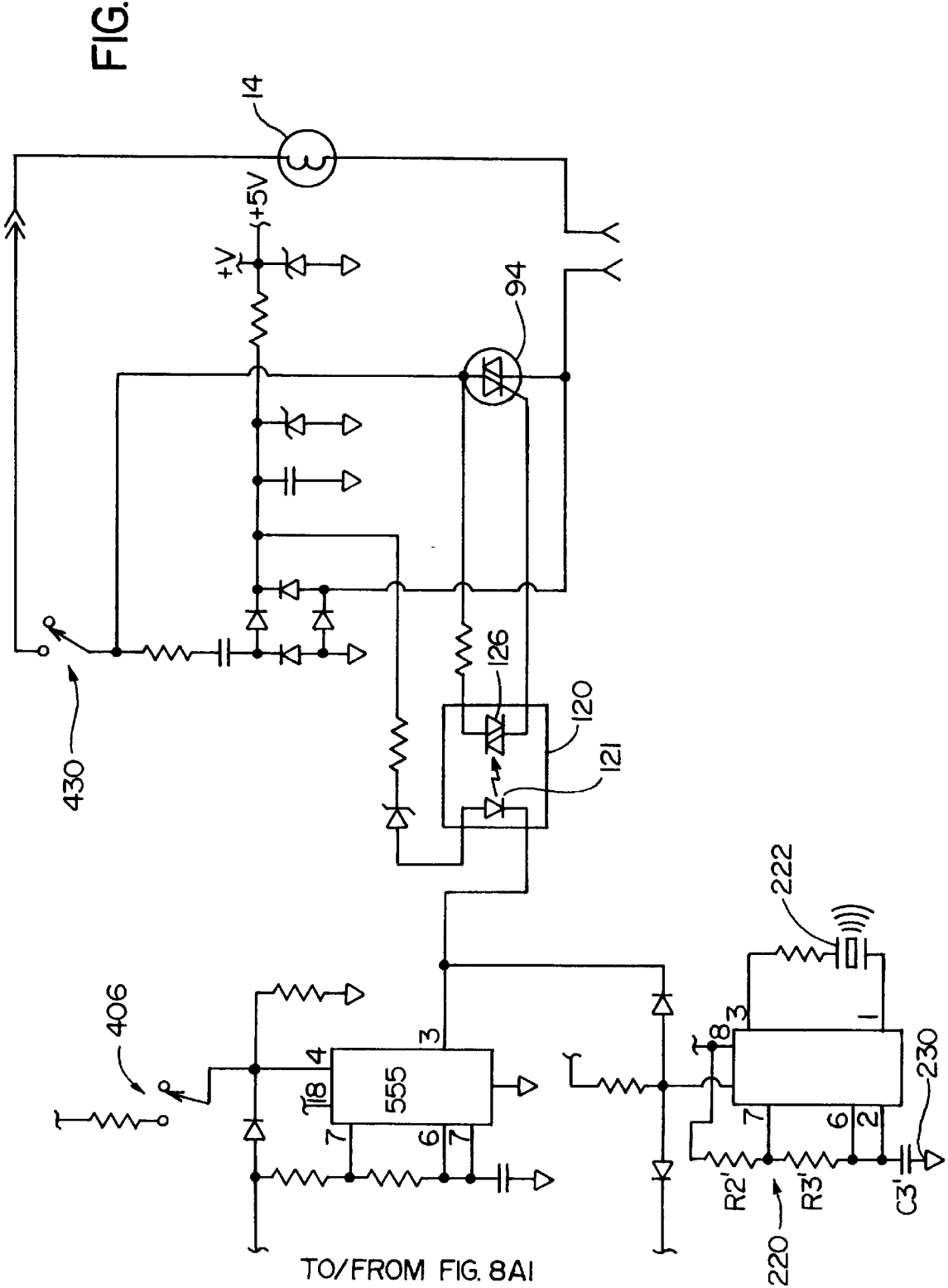
FIG. 8A2

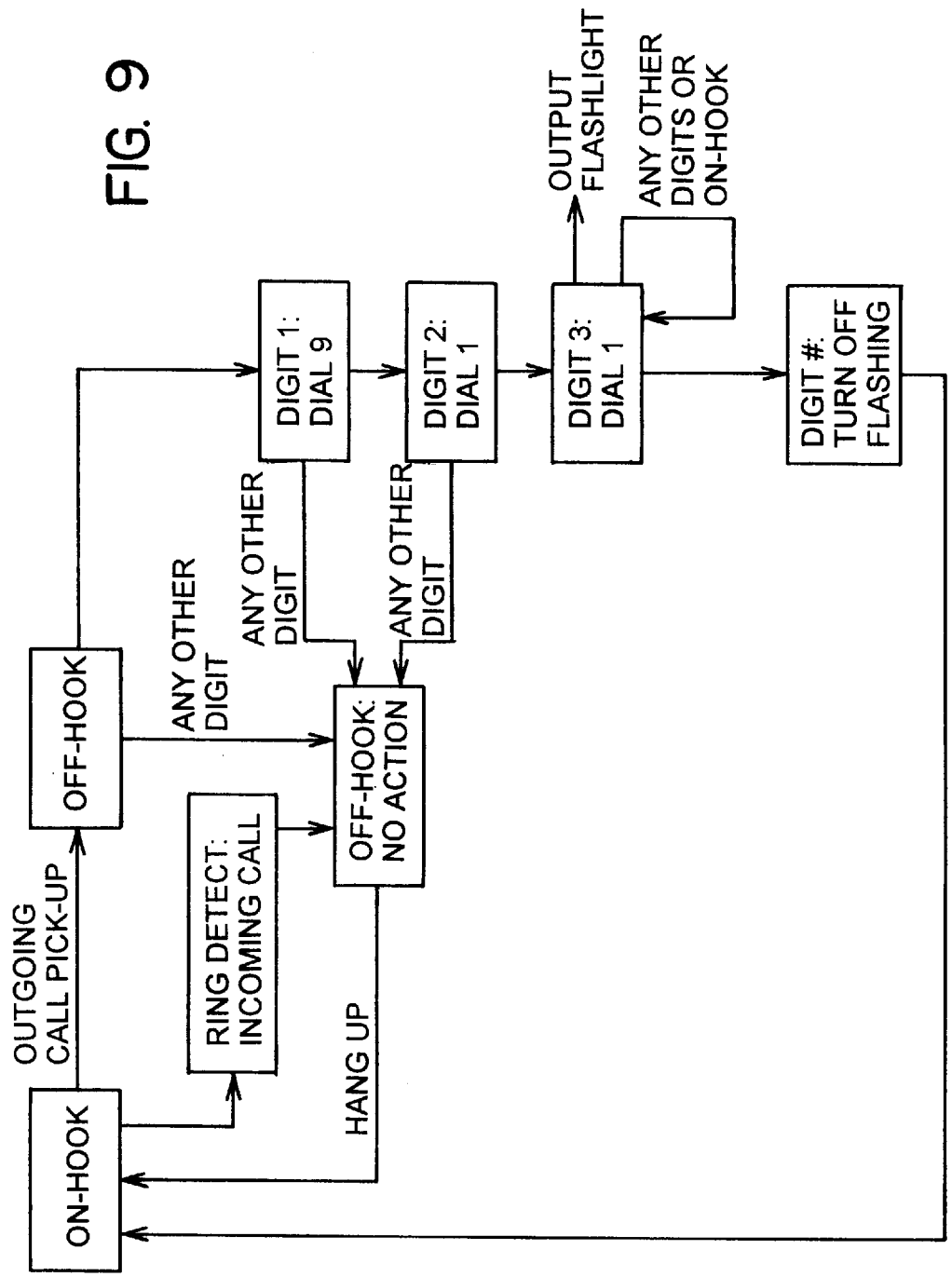

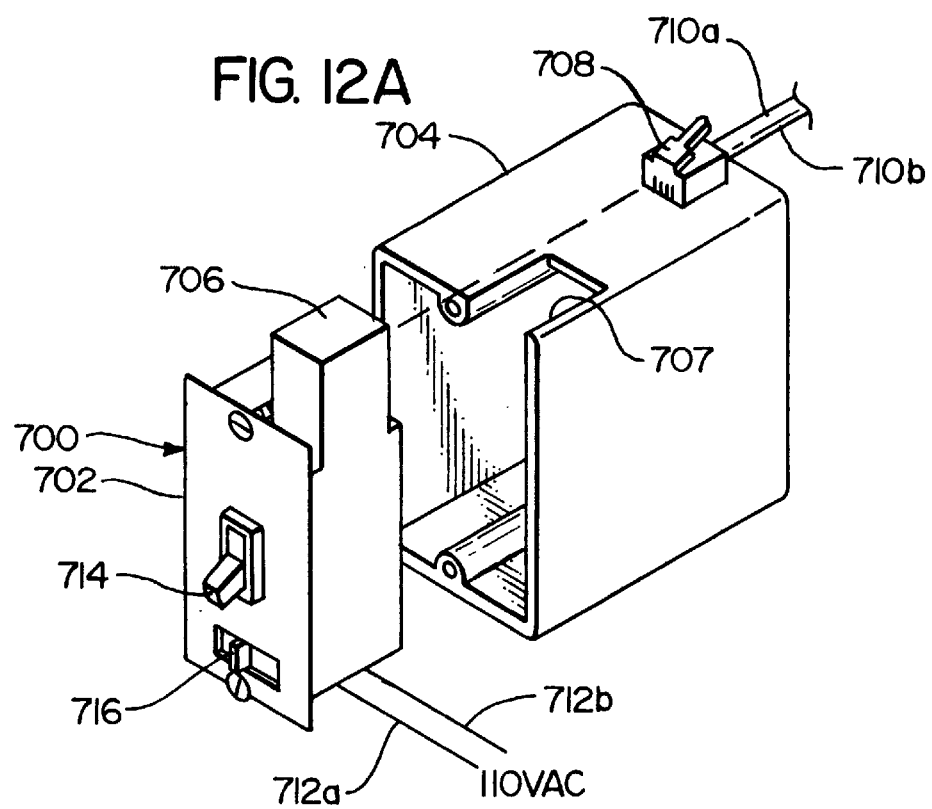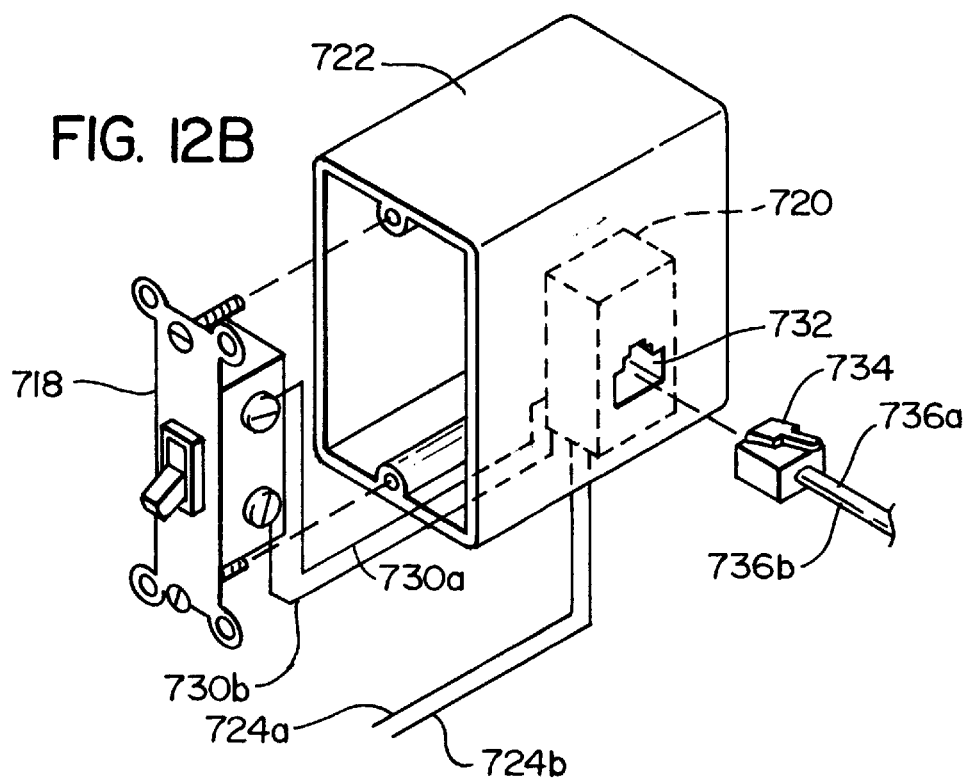

TELEPHONE-CONTROLLED ELECTRICAL SWITCH

FIELD OF THE INVENTION

This invention relates to a switch for automatically turning an electric light on-and-off, and more particularly, to a device for flashing an exterior house light to draw the attention of emergency response personnel to the house.

BACKGROUND OF THE INVENTION

Identification of houses by personnel responding to emergency calls has been a long-standing problem. House numbers are frequently attached to the house itself, and these are consequently often difficult to see from a distance or from a passing vehicle. This problem is particularly pronounced at night, when even a prominent house number may be difficult or impossible to see. Consequently, emergency service personnel such as ambulance drivers, firemen, or policemen often lose precious minutes in identifying the proper home during an emergency.

A number of devices have been proposed for identifying or drawing attention to a structure in an emergency. Predominantly, these have taken the form of dedicated systems which serve no other function apart from that of providing an emergency signal.

Because they are dedicated systems, these devices share a number of disadvantages for use in a residential environment due to their expense and the need for special display fixtures, mounting, and wiring.

Many of these drawbacks could be avoided by making use of a pre-existing system having some other primary function, with the alarm function being provided as a secondary function for use in an emergency. In this respect, a great majority of residential dwellings are provided with conventional porch lights which have the primary function of illuminating the entrance of the house which faces the street, and these are clearly visible to passing personnel. Also, the porch light frequently serves to illuminate the house number so that it can be read from the street. One attempt which has been made to utilize such porch lights to serve an alarm function is that disclosed in U.S. Pat. No. 4,730,184 (issued Mar. 8, 1988 to Bach), which shows an alarm assembly 80 which screws into a conventional porch light receptacle 89. The device consists of a sound generating assembly 82 which screws directly into the receptacle, and a light bulb 83 which screws into a second receptacle which is provided in the sound generating assembly. A "flasher unit" which periodically interrupts the flow of current therethrough is inserted in each of the receptacles, consequently causing the sound generating portion to pulsate, and the light bulb to flash on-and-off, whenever the porch light switch is turned on. A significant drawback of this device, of course, is the fact that once it has been installed in the porch light socket, this fixture can no longer be used as a conventional porch light to illuminate the porch area, which was the primary purpose for which it was originally installed.

Another, more sophisticated device which has been proposed for flashing the porch light of a house in a danger situation is that disclosed in U.S. Pat. No. 4,556,863 (issued Dec. 3, 1985 to Devitt et al.). This shows a switch device which is designed to be installed in a switch box in place of a conventional on/off switch, for the purpose of allowing a porch light to be flashed continuously on and off, as well as for permitting the light to be turned on and off in a conventional manner. Although this general approach is quite desirable from the standpoint of economy and convenience of installation, the actual switching circuitry taught by the Devitt patent encumbers the device with several serious drawbacks. This device employs a power switcher which is periodically enabled and disabled by an oscillator, with DC power for operating these components being stored in a capacitor 71 which charges up only during those intervals when the power switcher is not conducting. This is because the switcher acts as a short circuit in parallel with the supply to the capacitor during the period it is conducting, causing the main current to bypass the supply; but, during this same period the capacitor is discharging in order to supply power to the oscillator and buffer circuits to keep the switcher actuated. The light bulb can thus only be kept on until the energy stored in the capacitor has been used up, at which point the main light bulb must be switched off so that the capacitor can be charged up again. Since the current to charge up the capacitor must flow through a step-down resistor 69, the resistor will tend to overheat if this flow of current is very great. Consequently, the impedence of this resistor must be kept relatively high in order to keep the flow of current relatively low, but the net effect of this is that the charge-up rate of the capacitor is also kept very slow, and then the capacitor discharges relatively quickly when keeping the power switcher actuated. As a result, the Devitt device can only operate on a very limited duty cycle when flashing the porch light: this duty cycle (i.e., the ratio of the time interval the load is on to the sum of the intervals during which the load is on and off) may only be about 10–20%, and the practical affect of this is that the porch light is turned on for only short, dim flashes, which may be inadequate to effectively draw the attention of emergency response personnel to the house, or to illuminate address numbers so that they can be verified. Incidentally, if one were to attempt to overcome this deficiency by employing a resistor which would permit current to flow through it at a rate sufficient to significantly increase the duty cycle of the Devitt device (without the resistor overheating), this would necessitate use of a much larger resistor (e.g., on the order of 2 inches in height), which would tend to make it difficult or impossible to build the switching device so that it could fit in a conventional junction box.

Moreover, the majority of prior devices have required manual operation of the switch in order to activate the emergency mode of the system. This can be a disadvantage in some emergency situations, where the occupant is usually preoccupied with caring for the injured person and is sometimes in a near-panic condition. In short, while the occupant usually remembers to call "911", they may forget to take the additional step of actuating a separate switch mechanism.

Accordingly, there exists a need for an inexpensive and effective system for drawing attention to a residence or other building in which an emergency situation exists, and which selectively provides this alarm function automatically in response to the dialing of a designated emergency telephone number, by flashing a conventional porch light or the like on-and-off, yet which permits that light to selectively function in its normal on/off modes as well. Furthermore, there exists a need for such a device which flashes the light on-and-off with a sufficient duty cycle that it provides an effective emergency signal, as well as adequate illumination of the building entrance and its associated address numerals to permit these to be clearly observed by emergency response personnel. Still further, a need exists for a telephone-controlled electrical switch which can be used in a conventional switch box installation and which will provide substantially full electrical power to the lights or other electrical load.

SUMMARY OF THE INVENTION

The present invention has solved the problems noted above, and is an apparatus for energizing an electrical load in response to a telephone signal. Broadly, this comprises electrical switch means mountable in a switch junction box for controlling the flow of high-voltage AC current through first and second leads to an electrical load, control means mountabe to the junction box for selectively actuating the electrical switch means so as to energize the load in response to a telephone signal, and attachment means for connecting the control means to a telephone line on which the telephone signal is transmitted.

The control means may comprise decoder means for converting telephone signals to corresponding electronic signals and logic means connected to the decoder means for selectively actuating the switch means in response to receipt of a specific electronic signal having a predetermined structure.

The electronic signal may correspond to a dialed numerical sequence which represents a designated emergency telephone number, such as 9-1-1. In this case, the electrical load may comprise alarm means for drawing attention of emergency response personnel to a structure in which the apparatus is located. The alarm means may be a high-voltage AC exterior light fixture of the light structure, and the control means may be configured to flash this on and off cyclically.

Furthermore, initiation means are preferably provided for enabling the control means only in response to an outgoing telephone call, so as to prevent unauthorized actuation of the alarm means by a person telephoning in from outside the structure.

These and other features and advantages of the present invention will become apparent from a study of the following description and the accompanying drawings.

BRIEF DESCRIPTION OF THE DRAWINGS

FIG. 1 shows a porch light mounted to the exterior of a building and a switch unit incorporating the present invention mounted in the pre-existing electrical circuit for the light fixture;

FIG. 2 shows a block diagram of an electrical circuit incorporating a power convertor network which is used in the present invention;

FIG. 3 shows a diagram of a circuit implementing the block diagram of FIG. 2 including the power convertor network thereof;

FIG. 8A shows a circuit diagram similar to that of FIG. 4 but incorporating the decoder, logic, and dial tone detect sections of the circuit of FIG. 7A;

FIG. 9 is a state diagram illustrating the logic of the circuit which is shown in FIG. 8;

FIG. 12A is a perspective view of an embodiment of the present invention in which the circuitry is enclosed in a dedicated switch mechanism which is mountable in conventional junction boxes; and FIG. 12B is a perspective view of an embodiment of the present invention in which the circuitry is integral with the junction box in which a conventional switch mechanism is mounted.

Figure 4:
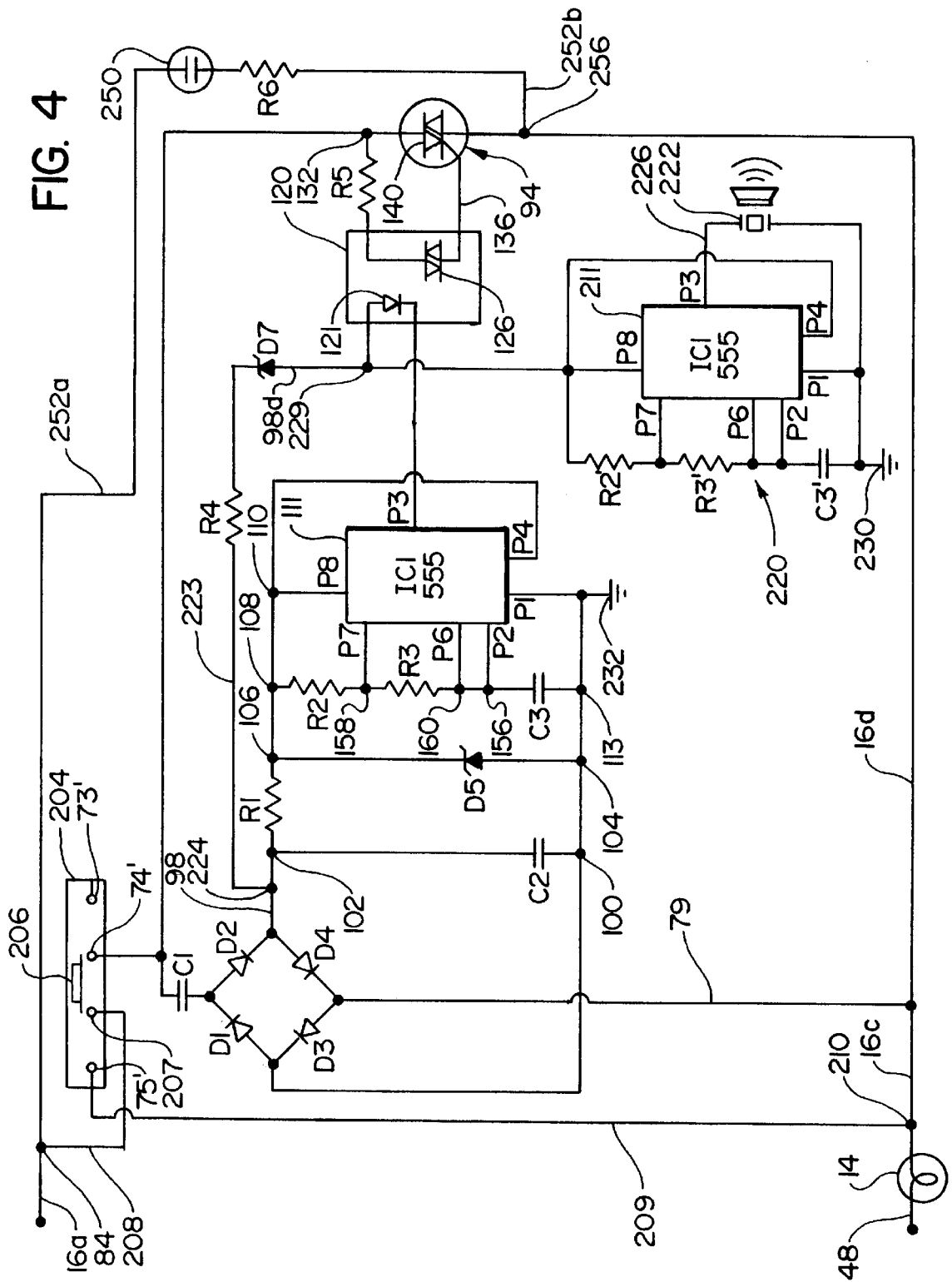
FIG. 4 shows a circuit diagram for an embodiment of circuit which incorporates a "beeper" for emitting an audible signal to indicate that the flash mode has been activated.

DETAILED DESCRIPTION OF THE INVENTION a. Electrical Load—Light Fixture

FIG. 1 shows a dwelling or other structure 10 having a conventional exterior porch light fixture 12. The light bulb 14 of fixture 12 is powered by conventional 120 volt 60 Hz AC household electrical current which is applied across first and second electrical leads 16 and 18. Mounted in lead 16, so as to control the passage of current therethrough, is a switch assembly 20 which incorporates the present invention, this switch assembly having a lever or rocker 22 by which an operator can select "on" or "off" positions. In the "on" position, the porch light is continuously lit, serving its primary function of illuminating the porch and entryway of the house 10; similarly, when switch 20 is in the "off" position, power to porch light fixture 12 is secured so that light bulb 14 remains dark. The switch also incorporates a "flash" mode which is automatically actuated upon the dialing of a dedicated emergency telephone number in which the switch assembly effects a periodic flow of current through lead 16, causing light bulb 14 of porch light fixture 12 to flash on-and-off in a manner which will draw the attention of emergency response personnel to house 10 and thus facilitate a rapid response to the emergency situation. In many installations, the bulb will also illuminate the street numbers of the house if these are positioned relatively near the bulb, so that the emergency response personnel can verify that they are at the correct address.

The switch assembly is configured so that it can be installed in a standard-sized light switch junction box in place of a conventional "on-off" wall switch, and then covered by a switch cover plate, thereby making for an easy and neat installation and eliminating the need for separate warning units, control units, connecting electrical cords, and the like, as have been employed in certain previously-proposed devices.

As will be described below, it will be understood that the present invention is applicable to a variety of other electrical loads, in addition to or in place of the porch light which is shown in the exemplary embodiment.

b. Circuit Description

FIG. 2 shows a block diagram of the flasher system, with the surrounding enclosure 30 being indicated by a broken line image. The primary components housed within enclosure 30 include (1) a switch mechanism portion 62, which is operated by a rocker or lever switch or other suitable switch, (2) a convertor network portion 64, which provides a DC power supply to (3) a timer portion 66 which controls (4) a driver portion 68, which, in turn, controls the activation of (5) a switcher portion 70. As the switcher portion 70 is alternately activated and deactivated by the timer and driver portions, it permits the periodic flow of current from lead 16 to lead 18 through light bulb 14, causing light bulb 14 to flash on and off. Inasmuch as switcher portion 70 is switching 120 volt AC household current, light bulb 14 can be an ordinary 120 volt light bulb, and there is no need to provide special low-voltage lightbulbs for use with the system of the present invention.

For purposes of illustration, switch mechanism 62 (unlike the automatic actuation system which will be described below) includes selectors 72, 72', which are movable by the rocker switch between "off" positions 73, 73', in which the selectors are physically removed from contact with lead 16 so as to interrupt the flow of current therethrough, to "flash" and "on" positions 74, 74'and 75, 75', in which selector 72 is in contact with lead 16 so as to permit the flow of current therethrough to switcher portion 70. Driver portion 68 provides a control function which periodically actuates switcher portion 70; when switcher portion 70 is actuated, current is permitted to flow through lead 16 to light bulb 14 and lead 18, causing light bulb 14 to be lit.

The duration of the period over which the driver portion 68 is activated so as to actuate switcher portion 70, is, in turn, controlled by timer portion 66, which is preferably an IC chip timer. Low voltage DC power is supplied to the timer portion 66 via connector 76 from the convertor network 64, this being connected across leads 16b and 16d by leads 78 and 79. The control current which actually initiates the switcher operation, however, is preferably supplied directly from the convertor network via lead 77, for reasons which will become apparent from the following description.

FIG. 3 shows a first embodiment of flasher circuit used to implement the block diagram of FIG. 2. 120 volt AC power supply lead 16 is connected via junction 84 to the "flash" and "on" contacts 74, 75. When the primary selector 72 is moved to the primary "off" contact 73, secondary selector 72' is simultaneously moved to secondary "off" contact 73'; in this position, selector 72 is physically removed from contact with lead 16, and power to the whole of circuit 80 is interrupted so that light bulb 14 remains unlit. Then, when primary selector 72 is moved into contact with the primary "flash" contact 74, and secondary selector 72' moves into contact with secondary "flash" contact 74', power flows from lead 16 via selector 72, junction 92, and lead portion 16c, to the first side of a triac 94. As is well known to those skilled in the art, a triac is a form of relay capable of switching a high voltage, high current circuit on and off. Since the triac 140 is capable of switching 120 volt AC current, there is no need for a transformer or other bulky device to step the current down to some lower voltage, thereby keeping the overall physical size of circuit 80 small enough to fit within a housing which is mountable in a conventional light switch junction box.

The on-and-off actuation of triac 140 is controlled by the driver, timer, and convertor network portions of circuit 80. Power is supplied to the first side of the convertor network portion via lead 78, which, as is shown in FIG. 5, is connected from junction 92 to capacitor C1, via resistor R1. Resistor R1 is a relatively small resistor (e.g., 330 ohm) which eliminates voltage spikes so as to protect the diodes and other components which are "downstream" of capacitor C1 from damage, since, as will be described in greater detail below, maximum current is permitted to flow through capacitor C1 until voltage begins to build up across it. Capacitor C1 drops the 120V AC current down to some lower voltage, for example, 20 volts AC, to satisfy the requirements of the convertor portion of the circuit. It should be noted in this regard that, although using a reduced-voltage power supply greatly facilitates the use of inexpensive and physically small components in circuit 80, it may be found desirable in some applications to employ certain of these components as do not require a reduced voltage supply current.

Using a capacitor C1 in the arrangement described in the preceding paragraph provides the circuit with several advantages. First, using the capacitor to drop the voltage, instead of using a resistor to do this, minimizes or eliminates the problem of having to dissipate heat, and so helps keep the components of the circuit small enough to fit within a switch box. Also, and perhaps more significantly, use of a capacitor C1 in conjunction with a triac (or an SCR) as the main switching device in the circuit permits the actuation of the triac to be essentially "divorced" from the power supply requirements of the timer portion of the circuit, with the result that the duty cycle of the circuit can be set at any virtually desired value, and furthermore, the circuit operates with virtually no degradation of the brilliance of the porch light bulb or the operation of other electrical loads. This aspect of the present invention will be described in greater detail below, with reference to FIGS. 4 and 5.

Capacitor C1 is connected via lead 78a to a diode combination D1, D2, D3, D4, at the junction between diodes D1 and D2. The diode combination, in turn, is connected by lead 79, at the junction between diodes D3 and D4, to lead portion 16d. The diode combination converts the 20 volt AC current which is outputted from capacitor C1 to 20 volt pulsating DC current, which is applied across positive output lead 98 and negative output lead 96. A second capacitor C2 is connected across leads 98 and 96 at junctions 100, 102, and this filters out the current outputted from the diode array, reducing it from a pulsating DC current to more of a straight line DC current. Furthermore, a zener diode D5 is connected across leads 96 and 98 at junctions 104, 106, which limits the voltage outputted by the diode array to a predetermined maximum, for example, 15 volts DC.

From junction 106, the positive supply voltage lead 98a is connected via junctions 108 and 110 to the supply voltage pin P8 of a 555 integrated circuit timer 111 (IC1). Similarly, the negative lead 96a is connected from junction 104, through junctions 112 and 113, to the ground pin P1 of the timer.

The 555 IC timer is the central component of the timer portion of circuit 80, and, as is well known to those skilled in the art, this is an inexpensive and effective stable timing-circuit device which can be used as a timer with trigger and reset provisions. A conventional 555 IC timer which is suitable for use in the circuit of the present invention is the Archer™ TLC555 Timer, which is available from Radio Shack, a Division of Tandy Corporation, Fort Worth, Tex. 76102. The timer is capable of producing time periods ranging from microseconds to hours, depending on the value of the associated external timing components (resistors R2 and R3, and capacitor C3, as discussed below). A conventional 555 IC timer is provided with eight connection pins, which are designated as follows: P1-GROUND, P2-TRIGGER, P3-OUTPUT, P4-RESET, P5-CONTROL VOLTAGE, P6-THRESHOLD, P7-DISCHARGE, P8-SUPPLY VOLTAGE. These pins are connected to various internal components, including a transistor, a flip-flop, and first and second comparators. The timer can be used as a monostable multi-vibrator, or as an astable multi-vibrator. Typically, the supply voltage ($V_{cc}$) can range from approximately +4.5 to +18 volts. While the 555 IC timer is a particularly suitable timing device for use in the present invention, it should, of course, be recognized that other timer devices exist which could be substituted for the 555 IC timer in circuit 80, such as, for example, an operation amplifier configured for timer operation, or one-half of a 556 IC timer.

FIG. 3 shows timer 111 (IC1) connected in the circuit so as to operate in the astable mode, so that the timer will trigger itself and operate as a free-running multi-vibrator. The external timing components consist of first and second resistors R2 and R3, and a capacitor C3. First resistor R2 is connected between the positive supply voltage lead 98 and the discharge pin P7 of the timer, and second resistor R3 is connected between discharge pin P7 and the threshold and trigger pins P6, P2. These latter pins are connected, in turn, through capacitor C3 to the negative supply voltage lead 96 at junction 113. Capacitor C3 charges through both resistors R2 and R3, but discharges through resistor R3 alone, into discharge pin P7. As a result, the duty cycle (ratio of on-to-off time) is controlled by the ratio of resistors R2 and R3, the timing and frequency equations for the 555 IC timer being as follows:

Charge Time $T_1$=0.693 (R2+R3) C3 (Output "High")

Discharge Time $T_2$=0.693 (R3) C3 (Output "Low")

Total Cycle Time $T=T_1+T_2$=0.693 (R2+2R3) C3

Frequency for

Oscillation $f=1/T=1.44/((R2+2R3)$ C3)

Duty Cycle $D=R3/(R2+2R3)$

The threshold and trigger levels of the timer are normally two-thirds and one-third, respectively, of $V_{cc}$. When the trigger input (pin P2) falls below the trigger level ($\frac{1}{3}V_{cc}$), the internal flip-flop of the timer is set, and the output (pin P3) goes to a "high" condition. Then, when the trigger input (pin P2) is above the trigger level ($\frac{1}{3}V_{cc}$), and the threshold input (pin P6) is above the threshold level ($\frac{2}{3}V_{cc}$), the flip-flop is reset and the output (pin P3) goes back to its "low" condition. Also, when the reset input (pin P4) goes low, the flip-flop is reset and the output (pin P3) again goes to the "low" condition. When the output (pin P3) is in the "low" condition, a low impedance path is provided between pin P3 and the ground pin P1. These relationships are summarized in the following Function Table:

TABLE 1

| Pin P4 (RESET) | Pin P2 (TRIGGER VOLTAGE) | Pin P6 (THRESHOLD VOLTAGE) | Pin P3 (OUTPUT) | Pin P7 (DISCHARGE SWITCH) |
|---|---|---|---|---|
| Low | Irrelevant | Irrelevant | Low | On |
| High | <$\frac{1}{3} V_{cc}$ | Irrelevant | High | Off |
| High | >$\frac{1}{3} V_{cc}$ | >$\frac{2}{3} V_{cc}$ | Low | On |
| High | >$\frac{1}{3} V_{cc}$ | <$\frac{2}{3} V_{cc}$ | As previously est. | |

So, looking at circuit 80 again, when selectors 72, 72' are in either the "on" position or the "flash" position, the positive output of the diode array is connected to pin P8, so as to provide the supply voltage which activates the timer. If the "on" position has been selected (as indicated by broken line images 118, 118'), the reset pin P4 is connected to ground pin P1, which consequently holds reset pin P4 continously in the "low" condition; as is shown in Table 1, when reset pin P4 is held in the "low"condition, output pin 3 is also held in a "low" condition. Thus, current is able to flow from junction 102 on lead 98, through the optoisolator 120 of triac driver portion 68, and into pin P3 of the timer. Resistor R4 serves to limit this current so as to satisfy the power limitations of the LED 121 in the optoisolator. The current flowing through optoisolator 120 and into pin P3 causes LED 121 to activate, and the light which it emits is transmitted in the direction indicated by the arrow to the internal, light-actuated triac 126. This actuates internal triac 126 so that it permits current to flow through it.

Light-activated internal triac 126 is connected, in turn, to "hot" lead 16c at junction 132, with a resistor R5 being connected between the junction and the optoisolator to limit the current to meet the requirements of the internal triac. The output side of the internal triac is then connected by lead 136 to primary triac 140, so that the current outputted from the internal triac of the optoisolator serves as a gate current which actuates the primary triac, causing the latter to substantially continuously permit the flow of current therethrough, so that this closes the circuit and energizes the porch light. Once the main triac is activated, the primary current continues to flow through it until (a) the gate current (flowing through lead 136) drops below a certain minimum level, and (b) the primary current (flowing from lead 16c to 16d in FIG. 5) also drops below a certain minimum level. As will be described in greater detail below, these conditions occur every half cycle, when the current and voltage through leads 16c, 16d drop to zero; when this happens, the main triac "opens", interrupting the circuit, but it is immediately reactivated again at the commencement of the next half cycle, so that light bulb 14 remains substantially continuously lit.

An example of a triac suitable for use as the primary triac 140 in the circuit of the present invention is the Archer™ 276-1000 (400 volt, 6 amp) triac, available from Radio Shack, a Division of Tandy Corporation. The triac is capable of switching the full 120V AC current, and, unlike some power switches which are configured essentially as diodes, it allows the full AC cycle to pass through it; in other words, relatively simpler diode-type switches permit the AC current to pass through only in one direction, so that, in essence, the current is "off" for half of the cycle, with result that the intensity of the flashing porch light is greatly reduced. While triacs are thus preferable to many known switching devices, and are also inexpensive and long-lasting, there are, of course, a number of other relay devices known to those skilled in the art which could be employed in the circuit in place of a triac.

An example of a suitable optoisolator for use in the flasher circuit of FIG. 5 is an Archer™ MOC 3010 optoisolator, available from Radio Shack, a Division of Tandy Corporation.

With reference again to FIG. 3, if the "flash" mode is selected, the selectors are moved to the central "flash" positions indicated by solid line images 72, 72'. In this configuration, the reset pin P4 of the IC timer is connected to the positive output of the diode array D1, D2, D3, D4. Since the output current thus is able to flow from the diode array to the reset pin, this places reset pin P4 in the "high" condition; the timer is thus activated and placed in condition for astable operation, becoming, in essence, an oscillator timer. In its initial condition, pin P2 is in a "low" state (e.g., at less than $\frac{1}{3}V_{cc}$—see Table 1 above), while output pin P3 is in the "high" state. Current consequently flows from junction 108, through resistors R2 and R3, to junction 156 at pin P2. The other side of junction 156 is connected by lead 162 to a first side of capacitor C3, the other side of which is connected via lead 164 to the negative output of the diode array at junction 112.

During the initial phase of operation, the voltage builds up at junction 156 on the first side of capacitor C3. Once this voltage exceeds $\frac{2}{3}V_{cc}$, so that both (a) the voltage at pin P2 exceeds $\frac{1}{3}V_{cc}$, and (b) the voltage at pin P6 exceeds $\frac{2}{3}V_{cc}$, the output pin P3 shifts to its "low" condition (see Table 1). Simultaneously, as an internal function of the timer, discharge pin P7 also goes to a "low" condition, placing the junction 158 between resistors R2 and R3 in a "low" condition. Capacitor C3, which was charged up to a relatively high voltage ($>\frac{2}{3}V_{cc}$) during the preceding phase, then discharges back through resistor R3 and junction 158 into discharge pin P7. As this is done, the voltage at junction 156 (pin P2) drops off, and when it drops below $\frac{1}{3}V_{cc}$, the output pin P3 returns to its "high" condition, as indicated in Table 1. As previously described the time of the cycle from high to low voltage is set by the values of capacitor C3 and resistors R2 and R3. In setting up the circuit shown in FIG. 5, it has been found preferable to employ relatively high resistance (R2, R3), as opposed to high capacitance (C3), in order to keep the physical size of the capacitor relatively small.

During the just-described sequence, output pin P3 cycled from a "high" condition to a "low" condition, and then back to its "high" condition. When pin P3 is in its "high" condition, current is prevented from flowing through optoisolator 120, so that LED 121 remains unlit. This, in turn, leaves the primary triac 140 in its deactivated state, so that it prevents flow of current therethrough. When pin P3 subsequently shifts to its "low" condition, it enables the output of the diode array to flow through optoisolator 120 and into pin P3, causing LED 121 to light and actuate the primary triac 140, in turn causing light bulb 14 to be illuminated. Then, when pin P3 returns to its "high" condition, light bulb 14 is extinguished. Hence, as output pin P3 of the 555 IC timer periodically cycles between the "low" and "high" states, the light bulb 14 of porch light fixture 12 flashes on and off; the rate at which the light flashes may be selected to effectively draw people's attention, and may be, for example, on the order of 1–4 times per second.

A neon light bulb 166 is also connected across leads 16c and 16d, at junctions 168 and 170, and a resistor R5 is connected in series with this in order to limit the flow of current therethrough to the requirements of the bulb. This neon light bulb flashes on-and-off in a cycle opposite that of the porch light bulb: when output pin P3 is in the "low" condition (so that light bulb 14 is illuminated), current flows through the main triac 140 instead of flowing through the neon light bulb and its associated resistor, but when pin P3 is in the high condition, triac 140 opens, with the result that the current flows through neon light bulb 250 and energizes it, and providing the operator with a visual signal that the system is operating in the emergency mode.

Furthermore, as was briefly noted above, it will also be highly desirable for many embodiments of the present invention to incorporate a "beeper" or other device for producing an audible signal which can be heard by the occupants of the house when the flash mode has been selected. Not only does this help assure the occupant that a signal is being sent to help emergency response personnel locate the dwelling, but it also eliminates the possibility that the switch may be accidentally left in the flash mode. Furthermore, in some embodiments, it may be desirable to provide an audible signal which is sufficiently loud and irritating in tone to discourage its unauthorized use, so as to help prevent children from playing with it and leaving the flash mode selected, or to prevent the occupants of the house from using it for undesirable purposes which might confuse or falsely alarm police or other emergency response personnel, such as, for example, signaling the location of a party or catching the attention of a delivery driver.

FIG. 4 illustrates an embodiment of the present invention which incorporates such a "beeper" or other sound emitting device. The circuit shown in FIG. 6 is similar in its overall configuration to that shown in FIG. 5, with the exception that (1) a secondary circuit and timer have been added for operating the "beeper", and (2) the neon light has been connected to the incoming lead 16a. Accordingly, like reference numerals refer to like elements in both FIGS. 5 and 6. A central aspect of the circuit shown in FIG. 6 is that it is provided with first and second 555 IC timers, 111 (IC1) and 211 (IC2); the first of these (111/IC1) serves primarily to control optoisolator 120 in the manner previously described, so that porch light bulb 14 flashes on and off at the desired periodicity. The second 555 IC timer (211/IC2), forms a part of subcircuit 220, and this serves to operate a piezoelectric element 222 so that the element emits a beeping sound at a desired frequency.

As previously described, the operation of the circuit is controlled by a selector switch. In the particular selector switch 204 which is shown in FIG. 4, there is a sliding contact 206 which bridges the gaps between the contacts in the switch. In the "off" position, sliding contact 206 bridges the gap between the "flash" contact 74 (which is connected to the main triac 140 and the associated convertor network, timer, and triac driver portions of the circuit) and a contact 73, which is simply an open. In the "flash" position, sliding contact 206 bridges the gap between a "hot" contact 207 (which is connected by lead 208 to high voltage lead 16 at junction 84) and the "flash" contact 74, so that the circuit flashes porch light bulb 14 on-and-off in the manner previously described. In the "on" position, sliding contact 206 bridges the gap between "hot" contact 207 and "on" contact 75, which is connected directly via lead 209 to junction 210 on lead 16e; thus, voltage is supplied directly from lead 16a to lead 16e so that porch light bulb 14 remains continuously lit, and the main triac 140 (along with the associated convertor network, timer, and triac driver portions of the circuit) are consequently bypassed when this switch position is selected.

Power is supplied to the "beeper" subcircuit 220 by a lead 223, which is connected at junction 224 to the positive output lead 98 from the diode array D1, D2, D3, D4. A resistor R4 is connected in lead 223, this having a relatively low resistance and serving to prevent large transients from damaging components in subcircuit 220. The secondary 555 IC timer 211 (IC2) is configured as an oscillator as previously described. In this case, when the output of pin 3 of timer 211 cycles to "high", this output passes through lead 226 to piezoelectric element 222, which is connected to ground on its other side by a lead 228, causing the element to be activated so that it emits an audible signal. Since the output of pin 3 cycles between "high" and "low" states as previously described, the acoustic output of piezoelectric element 222 buzzes or pulsates accordingly; the use of a secondary timer in the circuit shown in FIG. 6 permits the secondary oscillator to be configured to operate the beeper on a cycle which is completely independent from that of the primary timer 111 by selecting resistors R2' and R3' and capacitor C3' as desired. For example, it has been found suitable to configure the subcircuit 220 so that the secondary timer 211 cycles the activation of the "beeper" somewhere in the range of about 100–20,000 Hz (the normally audible range), with 2,000 Hz having been found to provide a particularly effective sound for bringing the operation of the device to the attention of an occupant of the building.

Lead 223, as well as supplying power to subcircuit 220, is also connected (at junction 229) to one of the two leads of the internal LED 121 of optoisolator 120, the other lead of the LED being connected to pin 3 of the primary 555 IC timer 111 (IC1). Consequently, it will be understood that when the optoisolator 120 is activated by the primary timer 111 (so that triac 140 is closed and porch light bulb 14 is lit), the current is flowing from lead 223 into pin P3 of the primary timer (which is in the "low" condition) instead of to the secondary timer, so that piezoelectric element 222 remains silent during this period; then, when pin P3 of the primary timer shifts to the "high" condition, so that the optoisolator and primary triac are deactivated, the current flows from lead 223 to voltage supply pin P8 of the secondary timer (as well as to the remaining components of subcircuit 220) so that the piezoelectric element is activated. In other words, when the porch light periodically flashes on, the "beeper" will be de-activated, and then when the porch light flashes off, the beeper will be activated so that it oscillates at its predetermined frequency.

In the particular embodiment illustrated in FIG. 4, the negative side of capacitor C3 and pin P1 of the primary timer 111 are connected to ground 232. Similarly, capacitor C3' of subcircuit 220 and pin P1 of the secondary 555 timer 211 are also connected to ground at 230. This is a simple and effective arrangement for completing each of these subcircuits; however, it will be understood by those skilled in the art that the negative sides of these components can be connected in a complete circuit without necessarily being connected directly to ground.

FIG. 4 also shows a neon light bulb 250, which is connected by lead 252a to 120V AC lead 16 on the "hot" side of switch 204 (at junction 84), and then by lead 252b to junction 256 in lead 16d between triac 140 and porch light bulb 14. A resistor R6 is also connected in lead 252, in series with bulb 250. Neon light 250 has essentially the same primary function as that shown in FIG. 3, in that it flashes to provide a visual indication that the emergency "flash" mode has been selected.

As for the piezoelectric elements employed in the circuits of FIG. 4, this can be any suitable electrical element which emits an audible signal in response to a voltage being applied across it.

Having described the operation of the circuits shown in FIGS. 3 and 4, several of the significant advantages which are achieved by using capacitor (C1) to step down the voltage for the control portions of the circuit, in conjunction with using a triac (140) for switching the main current on and off, will now be discussed in greater detail. One of the most significant of these advantages stems from the fact that the main triac needs only an initial "pulse" of gate current in order to be activated, and it will then remain closed so long as there is current applied across it; thus, there is no need to supply gate current continuously in order to keep current flowing through the main triac once it has been actuated. The circuits shown in FIGS. 3 and 4 take advantage of this fact by using the current lead characteristics which are inherent in capacitor C1 to obtain a short, low-voltage "pulse" of gait current which activates the main triac with a minimum expenditure of energy.

Figure 5A:
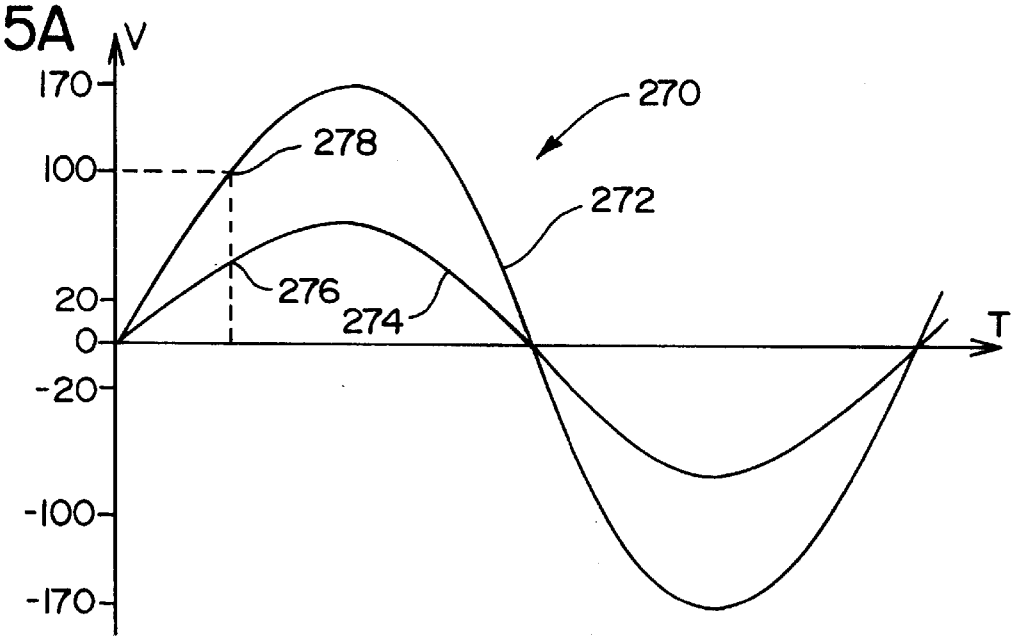
FIGS. 5A–B show first and second 120V 60 Hz AC sine waves representing the cycle of a standard house current, FIG. 5A showing the unmodified current and FIG. 5B illustrating the current lead affect of a capacitor incorporated in the switch, and how this permits a low voltage supply current pulse to pass therethrough.
Figure 5B:
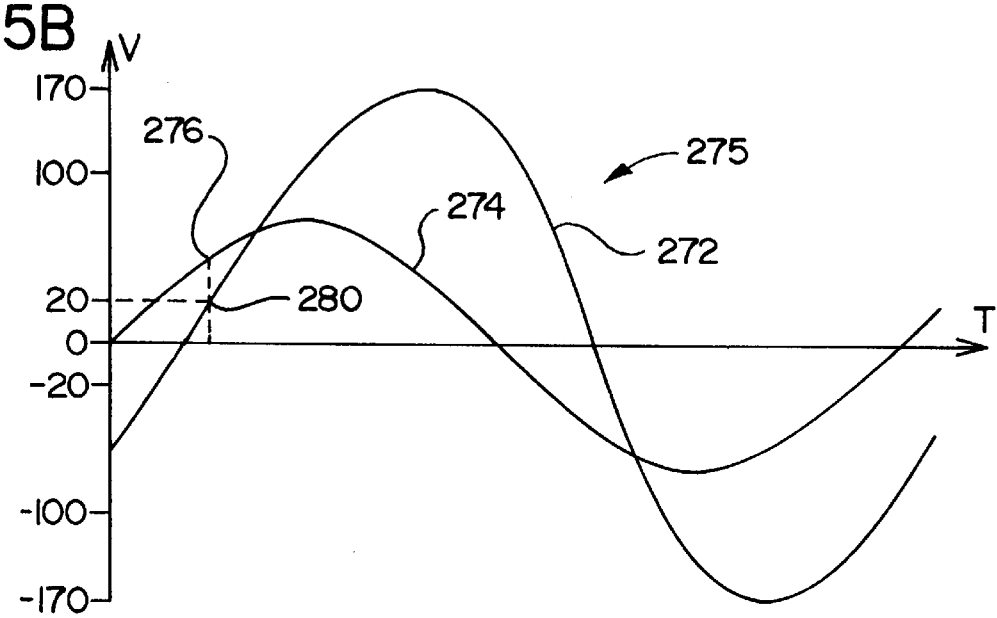

FIGS. 5A and 5B demonstrate the voltage lead characteristics of an exemplary capacitor C1, as this relates to the circuits shown in FIGS. 3 and 4. FIG. 5A shows a sine wave 270 representing the cycle of a standard, unmodified 120V AC household current, with curve 272 representing voltage and curve 274 representing current. As is shown, the voltage and current curves are initially more-or-less in phase, so that their peaks and minimums coincide. "120V" AC current is, of course, actually 120 volts RMS, so the peak voltage is actually ±170 volts, as is shown in FIGS. 5A and 5B. Furthermore, it should be noted here that, although 120V 60 Hz AC current is the standard in the United States, there are, of course, a number of other standard household currents in use throughout the world (e.g., 200V 50 Hz AC), and it is well within the ability of those skilled in the art to modify the exemplary circuits shown herein to properly function with these.

As previously described, the power for the control portions of the circuits is taken from the 120V AC current, and let us assume, for exemplary purposes, that the current requirement for actuating the internal LED of the optoisolator 120 is 10 milliamps (this is typical of such optoisolators, which generally have relatively low current requirements). 10 milliamps is represented on exemplary current curve 274 by point 276, and this corresponds in time to a specific voltage on curve 222; in this case the corresponding voltage is 100 volts, as indicated at point 278. Thus, in order to obtain the 10 milliamps required to operate the optoisolator, it will be necessary to use up 100 volts of the unmodified current half-cycle, and so a relatively great portion of the available energy would be so expended.

FIG. 5B, by contrast, illustrates the situation when the 120V AC current has passed through an exemplary capacitor C1 (disregarding for purposes of illustration any voltage step-down which would also occur). The resulting current lead effect is shown in FIG. 5B by the fact that the current and voltage curves are now essentially out of phase; this is because the capacitor initially allows maximum current to flow through it, with the current flow subsequently dropping off as the voltage builds across the capacitor. Thus, FIG. 5B shows the current curve 274 increasing before the voltage curve 272, and then dropping off as the voltage curve builds towards its peak. The net affect of this is that the 10 milliamp point 276 on current curve 274 now corresponds in time to a much lower point on the voltage curve; in the example shown in FIG. 5B, the 10 milliamp point 276 now corresponds to a 20V point 280 on voltage curve 272, instead of the 100V point shown in FIG. 5A. This lower voltage is sufficient to energize the internal LED of the optoisolator, being that the current need only flow into pin P3 of the timer, which is in its "low" condition. Thus, use of the capacitor C1 permits 10 milliamps of current to be supplied to the optoisolator at a much lower voltage, and with much reduced expenditure of the available energy.

Figure 6A:
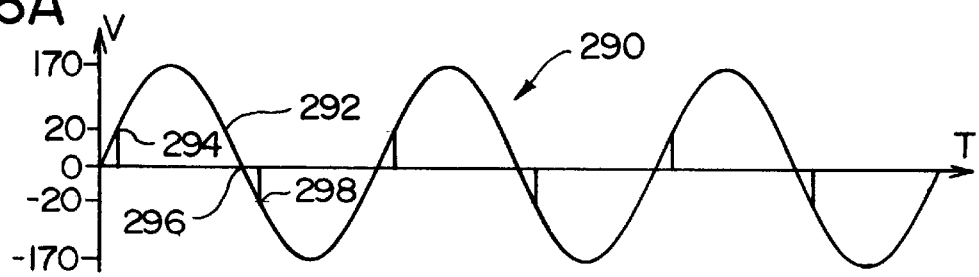
FIGS. 6A–C show a sine wave similar to that shown in FIGS. 5A–B and illustrate the portions of the current cycle which are employed to (a) provide the pulse for turning on the main current flow to the main light bulb, and (b) illuminate the bulb itself.
Figure 6B:
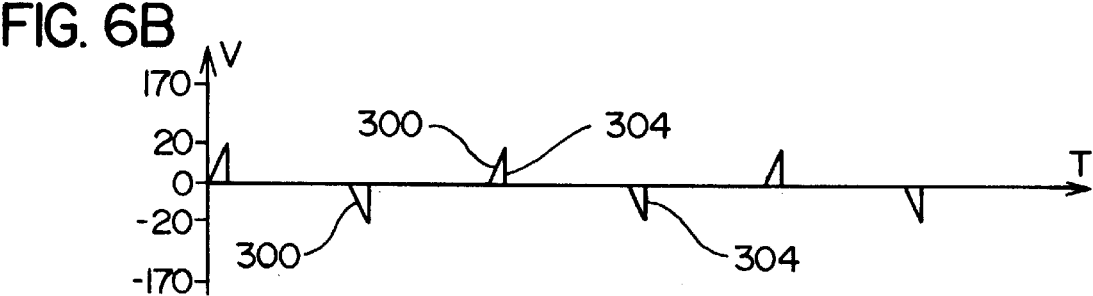
Figure 6C:
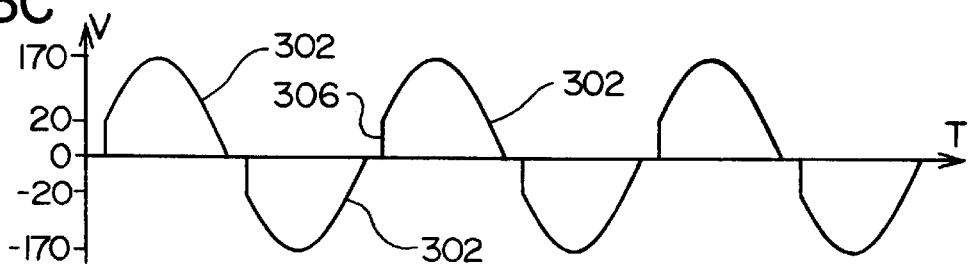

FIGS. 6A–6C show the allocation of power to the switch mechanism, as compared to that supplied to the main light bulb, using the exemplary values derived from FIGS. 5A and 5B.

FIG. 8A shows a sine wave 290 representing the voltage curve 292 of the standard 120V AC household current. As previously described, this current is supplied to both (a) the main triac (140), and (b) the internal convertor network, timer, and triac driver which control the operation of the main triac, both of these being connected to the "hot" lead 16 at junction 92. Since capacitor C1 is used to step down the voltage supplied to the convertor network, maximum current initially flows through the capacitor to the diode array and optoisolator 120, energizing internal LED 121. As previously described, the current required to do this is assumed to be 10 milliamps, and, because of the current lead affect of capacitor C1, this corresponds to 20 volts on the voltage curve, as indicated by point 294. Thus, once this point in the cycle is reached, the internal triac 126 is activated, so that this, in turn, permits the gate current to flow through lead 136 to energize the main triac 140. However, once the main triac is actuated, the current flows through it from junction 92, in essence "grounding out" the convertor network, timer, and triac driver portions of the circuit, so that the remaining portion of the AC half cycle is directed entirely through light bulb 14; current thus ceases to flow through the control portions of the circuit, and, likewise, the gate current ceases to flow to the main triac 140, but, as noted above, the main triac remains activated so long as current is applied across its main leads.

However, when the current cycle subsequently reaches the halfway point (i.e., the end of the half-cycle, at ¹⁄₁₂₀th of a second from the beginning of the cycle) the voltage drops to zero as indicated at point 296. When this happens, the main triac 140 de-energizes or "opens" again (as previously described), so that another gate current pulse is required to reactivate it. This occurs at the beginning of the next half cycle, and in this case the necessary 10 milliamps of current is supplied to the optoisolator at the –20V point in the cycle, as indicated by point 298. This activates the main triac again, grounding out the control portions of the circuit and directing the full energy of current to the main light bulb 14 for the remainder of the half cycle. The voltage then passes through zero again, after which the previously described sequence repeats itself.

From the foregoing, it is apparent that the circuits shown in FIGS. 3 and 4 are, in essence, "stealing" a small pulse of energy at the beginning of each half cycle of the AC supply current, and using this pulse to switch on the main triac; these small pulses are also being supplied to capacitor C2, and this is sufficient to keep capacitor C2 charged up so that it can supply the necessary energy to keep the 555 IC timer 111 operating in the manner previously described.

FIG. 6B illustrates these small pulses of energy 300 which are captured by the control portions of the circuit. Because these small pulses of energy are received at the beginning of each half-cycle, the control portions of the circuit do not have to rely on a "shut down" period of the main light bulb to charge up capacitor C2 so that it can operate the timer and triac driver portions of the circuit; the net effect of this is that the circuit can be set to provide whatever duty cycle is desired for the main light bulb 14, since the circuit is not limited to having to shut the bulb off at any given point in order to charge up the energy storage portion of the circuit. This is to be contrasted with the situation where the energy is gathered and stored only when the main circuit is open and the light bulb off; once the stored-up energy has been expended enabling the gate current and powering the timer, this sort of circuit (unlike that of the present invention) has to shut off the main light bulb until its storage capacitor can be charged up again. As previously mentioned, the practical consequence of this is that such a design can operate only on a limited duty cycle (for example, a 10–20% duty cycle) which permits only a very brief flash; the other 80–90% of the time the light bulb has to be shut off while the circuit is storing up energy.

Another advantage of the circuit of the present invention is that, as described above, the actual amount of energy used by the control portion of the circuit is relatively small, this being "stolen" at the very beginning of each half cycle. Most of the energy, of course, is towards the peak of the half cycle, as is apparent from the partial curves 302 shown in FIG. 6C; these represent the remaining energy of each half-cycle which is supplied directly to the main light bulb 14 (through the triac 140), after the initial pulse of current has been captured by the control portions of the circuit. Since the vast majority of the energy thus continues to be supplied directly to the light bulb or other electrical load, the bulb achieves virtually its full normal brilliance even when it is being flashed. As is also apparent from FIG. 6C, the main light bulb will be momentarily cut off at the beginning of each half cycle, but the duration of this interruption is so short that it is imperceptible.

Another significant advantage which is made possible by this arrangement (i.e., using the relatively small pulses of energy to energize the control portions of the circuit) is that this avoids the relatively great voltage transients which would otherwise occur when switching the energy to and from the control portions of the circuit. As indicated by the vertical slopes 304, 306 in FIGS. 6B and 6C, these transitions are, in this example, only 20 volts in magnitude (i.e., from 20 volts to 0, or vice versa), as opposed to, say, the 100V transient which would occur if the circuit was not configured to take advantage of the current lead effect offered by the capacitor C1. The practical effect of minimizing these transients is that it reduces the electromagnetic influence (EMI) problems which would otherwise occur, such as difficulties with radio reception and the like.

It should be noted at this point that, although using a capacitor C1 as shown in FIGS. 3 and 4 to step down the voltage of the supply current provides these circuits with the advantages discussed above, it may be found desirable to substitute a resistor of similar impedance for the capacitor C1 in some circuits incorporating the present invention, primarily from the standpoint of simplicity and economy. This arrangement will still permit the control portion of the circuit to capture a pulse of energy at the beginning of each half-cycle of the supply current when operating in the "flash" mode, so that this can be used to close the main triac, after which the triac will "ground out" the control portion of the circuit so that the remainder of the half-cycle will be routed through main light bulb in the manner previously described. Likewise, the storage capacitor will still be able to store a part of each of these captured pulses so that the duty cycle of the flashing light can be set to whatever value is desired; the overheating and size problems previously discussed with respect to resistors serving in this role will be minimized or eliminated by the fact that, in the circuits incorporating the present invention, the current would flow through the resistor only in short pulses at the beginning of each half cycle, rather than continuously. However, it should also be noted that, because no current lead effect would be provided by the use of such a resistor, the current required to actuate the triac driver (i.e., the optoisolator) would be reached at some relatively higher voltage (e.g., 80–100 volts) than when using the capacitor C1, and so the voltage transients and the resulting EMI interference would be somewhat greater. Furthermore, because a significantly greater portion of the energy of each half cycle of the supply current would thus be taken by the control portions of the circuit, less energy would be left for the main bulb, and so its flashes would be somewhat dimmer than its ordinary full brilliance.

c. Automatic Activation

FIGS. 7A–12B illustrate an embodiment of the present invention in which actuation of the "flash" mode is initiated by the dialing of an emergency telephone number (e.g., "911"), rather than by manual operation of a switch as has been described in the preceding sections. As will be discussed, these embodiments are also preferably provided with protection against accidental or unauthorized actuation of the emergency mode, as by a prankster calling in from an outside line and dialing the emergency number.

Inasmuch as the circuits shown in FIGS. 7A–11 are substantially the same as those which have been described above except for the addition of the decoder sections, the following description will focus on the latter and will only discuss the balance of the circuit where this differs from what has been described above, and therefore like reference numerals will be used to designate like components.

Figure 7A:
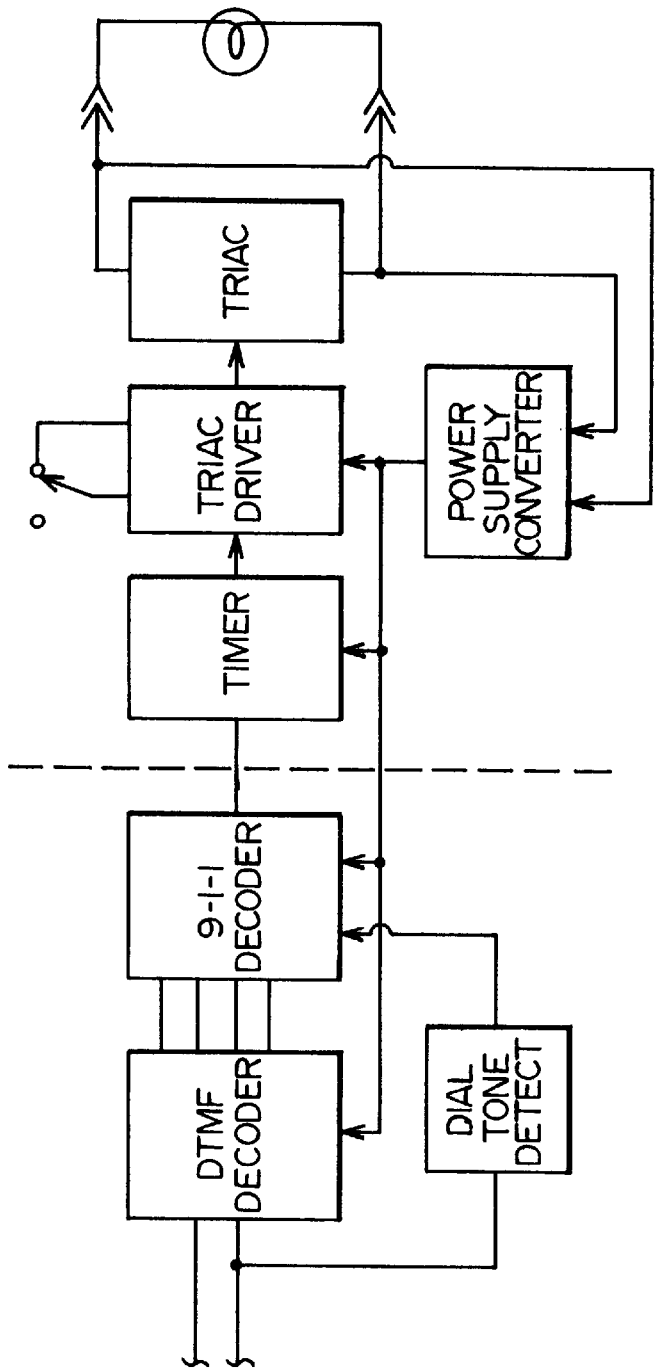
FIG. 7A is a block diagram similar to FIG. 4, showing an electrical circuit in accordance with the present invention which incorporates a section for decoding an emergency telephone number for automatic actuation of the circuit, and a dial tone detect portion for preventing undesirable actuation of the emergency mode.

Accordingly, the circuit 400 shown in FIG. 7A is generally identical to that which is shown in FIG. 4, except for the addition of the decoder section 402 (which is indicated to the left of the dotted line 404), and, due to this flash function being provided by the decoder section, the switch portion 406 has only "off" and "on" positions.

As is shown in the block diagram, the decoder section 402 is connected across the two phone leads 410, 412. The decoder section comprises a DTMF (dual tone multiple frequency) decoder 414 which converts the "number" tones on the phone line to a binary code. The binary output from the DTMF decoder is fed to the logic circuit 440. In the embodiment which is illustrated, the output from the DTMF decoder 414 is supplied to a 911 decoder designated 416 ("911" as used herein representing any selected emergency telephone number or other predetermined number sequence), which in turn initiates the emergency "flash" mode in the balance of the circuit 400.

The decoder section of the circuit is also provided with an enablement circuit 420. The only purpose of this section is to ensure that the decoder section activates the emergency "flash" mode of the circuit in response to an outgoing call which begins with the dialing of the proper number sequence, and not in response to an incoming call; thus, a "prankster" or other party who dials into a number will not be able to activate the emergency "flash" mode by dialing "9-1-1" on the calling phone, even though the dial tones will be transmitted across the phone lines. In short, this portion of the circuit ensures that the light will only flash when a person in the dwelling dials out using the emergency sequence.

In the embodiment which is illustrated in FIG. 7A, the enablement protection section 420 is provided by a dial tone detect portion 422; the dial tone detect portion enables the logic circuit only upon detection of the dial tone which, the telephone system produces when a person picks up the phone to call out, and which does not occur when a person picks up a phone in response to an incoming call.

Figure 7B:
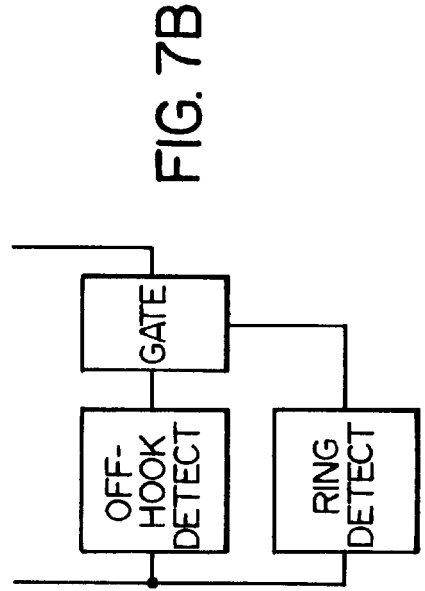
FIG. 7B is a block diagram view of a circuit which is substantially identical to that shown in FIG. 7A, except that an off-hook detect/ring detect section is substituted for the dial tone detect section to prevent undesirable actuation of the emergency mode.

In the alternative embodiment which is shown in FIG. 7B, the initiating section 420 comprises an off-hook detect portion 424, a ring detect portion 426, and a gate portion 428. These cooperate to enable the logic circuit in response to detection of the "off-hook" signal, but only in the absence of a preceding "ring" signal. In other words, if the phone is picked up and an "off-hook" signal is generated without the telephone first ringing, then the loop circuit will be enabled, but the circuit cannot be enabled by an incoming call, because the telephone will ring before it is picked up.

Having provided an overview of the system of the present invention which incorporates a decoder section, the exemplary circuits employed therein will now be described in greater detail.

FIG. 8A shows a circuit diagram which corresponds to the block diagram of FIG. 7A, in which the enablement protection is provided by the dial tone detect circuit 422. As was noted above, the converter network, timer, triac driver and triac portions of the circuit to the left of dotted line 404 are essentially identical to those described above and therefore will not be described here, except for the switch portion 406 which has only on and off positions. Also, a cutout or "service" switch 430 is provided for isolating the light 14 from any possible current flow while the bulb is being changed.

As is well known in the art, when a modern telephone is dialed, the "numbers" are represented by predetermined "Touch-tones". These tones are transmitted across the phone lines from station to station, either from the dialing phone to the receiving one or vice versa. In the decoder section 402 which is illustrated, a dual-tone multiple frequence ("DTMF") decoder 414 (e.g., a Teltone™ 8870 chip) is connected to the phone lines 410, 412, through isolating capacitors C11 and C12. Protection circuitry 432 is provided between the DTMF decoder and the phone leads in accordance with FCC Part 68, and optionally to protect the components of the circuit from voltage surges/spikes caused by lightening strikes and other events; this is required by FCC regulations where (unlike the embodiments described above) a signal is to be transmitted out from the device across the phone lines. The first phone lead (410) is connected to pin 1 of the DTMF decoder via resistor R11, and also to pin 4 via resistor R12. The second lead (412) is connected to pin 2 of the decoder, via resistor R13, and to pin 3 via resistor R14. Lead 412 is also connected to pin 4 of the DTMF decoder, through resistor R15 so that the two leads are interconnected via R11, R12, R15, and R13.

The power is supplied to the DTMF decoder from the converter network via lead 434, which is connected to pins 18 and 10, to pin 17 via capacitor C13, and to pin 16 in capacitor C13 resistor R16. Pins 5, 6 and 9, are connected to ground at 436. Pins 7 and 8 of the DTMF decoder 414 are connected across a crystal 438 which provides a constant frequency (3.597545 MHz) reference signal.

The DTMF decoder 414 serves to convert each "number" tone which is received from the phone leads 410, 412 to a corresponding binary signal (e.g., the number 9 is represented by the binary code "1001"). The DTMF decoder 414 is interconnected with a binary-to-decimal decoder 444 (e.g., a 4028B IC) by leads 442a–d; the connections of the DTMF decoder pins to the binary-to-decimal decoder pins in the illustrated embodiment are as follows: 14-11, 13-12, 12-13, 11-10. In turn, pin 5 of the decimal decoder 444 goes "high" in response to receipt of a binary code representing the digit "9", while pin 14 of the goes high in response to receipt of a sequence representing the digit "1".

The output of the binary-to-decimal decoder 444 is fed from pin 14 to the input pin 1 of a NAND gate 450, via lead 452. Pin 5 of the decoder 444, in turn, is connected via lead 452 to pin 1 of a first NAND gate 450. Pin 2 of NAND gate 450 and pin 6 of NAND gate 456 are connected (via leads 458, 460) respectively to pins 3 and 2 of a first decade counter 448.

Pin 15 of the DTMF decoder 414 is also connected via lead 446 to pin 14 of the decade counter 448 (e.g., a 4017 IC). The output pins 3 and 4 of the two NAND gates 450, 456, in turn, are connected to pins 8 and 9 of a third NAND gate 462. Finally, the output pin 10 of NAND gate 462 is connected via lead 464 to pin 14 of a second decade counter 468 (e.g., another 4017 IC). Power (e.g., +5V) is supplied to decade counters 468 at pins 16.

As was noted above, pin 2 of the first decade counter 448 is connected to pin 2 of the first NAND gate 450, while pins 4 and 7 are connected to pin 6 of the second NAND gate 456. Pins 10 and 13 are bridged, and pin 8 is connected to ground at 470. Pin 15 of the counter is connected via lead 474 to pin 15 of the second decade counter 468. Lead 474 is also connected, via inverter 476, to the output pin 11 of the inverter which is connected to the second NAND gate 478, which in turn is connected to the dial tone detect circuit 422. Components 450, 456, 462, and 478 may be carried on a single 4011 IC chip.

In the embodiment which is illustrated, the dial tone activates the dial tone detection circuit 422, which generates an output pulse which enables the logic circuit 440. In particular, pin 5 of the M-980 call progress tone detector IC labeled 480 is connected via lead 482 and resistor R14 to pin 3 of the DTMF decoder 414, which is also connected to phone lead 412. Pin 1 of the IC 480, in turn, is connected to the clock output of the crystal 438, via lead 484, and power is supplied from the converter network at pins 3 and 8, a capacitor C14 being connected between this and ground to eliminate any voltage differential between IC 480 and IC 414. Using the reference frequency which is provided via the clock lead, the M-980 call progress tone detector IC decodes the dial tone (a combined 350/440 Hz signal), which results in the output at pin 4 of the IC going "high", this being connected to pin 12 of NAND gate 478 via lead 486.

The operation of the circuit shown in FIG. 8A will now be described in detail. The sequence begins with the operator lifting the phone receiver off of its hook, generating a dial tone on the phone leads. This enables the logic circuit, the operation of which is as follows: As the first digit of the emergency number or other predetermined sequence is pressed, the DTMF decoder 414 receives the dual-tone signal having the corresponding frequencies via leads 410, 412. The tone is converted to a binary sequence (for example, the tone, the number "9" could yield a binary sequence "1001"), and the four digits of the binary code are outputted via leads 442a–d, to pins 10–13 of the decimal decoder 444. The DTMF decoder also puts out a pulse at pin 15 (i.e., pin 15 goes "high"), and this is received at pin 14 of the first decade counter 448, counting the first dialed digit, and therefore pin 2 of NAND gate 450 being forced "high" via connection 458.

As was noted above, simultaneous with the output at pins 11–14, the output at pin 15 goes "high", and this pulse is provided to pin 14 of the first decade counter 448, which counts the dialed digits. The "high" or "1" pulse which results from the single dialed digit is outputted from pin 2 of counter 448 to pin 2 of NAND gate 450, pin 1 of the NAND gate also being "high" due to the output at pin 5 which results from the decoder IC 444 decoding a "9"; this forces the output at pin 3 of the NAND gate 450 to "0" (or "low"), which in turn is supplied to pin 8 of the next NAND gate 462.

As was noted above, pin 14 of the 911 decoder IC 444 also goes "high" in response to receiving a dialed digit "1". This pulse is received as a "1" at pin 1 of NAND gate 456, and at the same time pin 2 of the NAND gate 456 receives a "high" or "1" from pin 2 of the first decade counter 448 for counting the second dialed digit. This yields a "0" at pin 3 of NAND gate 456, which is supplied to pin 2 of NAND gate 462. In other words, both pins 1 and 2 of the NAND gate 462 receive a "0" in response to the first dialed digit "9" and a second dialed digit "1", and pin 3 of NAND gate 462 produces a pulse which is clocked in by the second decade counter 468 to record the first and second dialed digit in the sequence.

Dialing of the next digit (i.e., "1") similarly decoded by the 4028B chip and on pine 14 the thrid pulse is "clocked in" by the decade counter 468. Upon receipt of the third digit in the programmed sequence, the output pin 7 of the second decade counter goes "high". The resulting pulse activates the balance of the circuit 400, flashing the lamp 14 as previously described. Pin 13, which is "high" holds or "latches" the decade counter 468 in the "high" state until the service switch is turned off.

In the event that a sequence other than "9-1-1" or other designated emergency number is dialed (i.e., the person is simply dialing out to reach another party and is not calling for emergency services), the logic circuit will not actuate the "flash" portion of the circuit. For example, if the first number which is dialed is not a "9", then pins 5 of the decoder 444 will remain low, providing a "0" to the pins 1 of both NAND gate 450. The first decade counter 448, however, will receive a pulse from pin 15 of the DTMF decoder 414, so that its pin 3 goes high. This provides a "1" pulse to pins 2 of the NAND gate 450, so that the output (at pin 3) is still a "1". This, in turn, provides a "1" at both pins 8 and 9 of NAND gate 462, so as to yield a "0" at its pin 10, with the result that the second decade counter 468 does not receive a pulse which it would be "clocked in" as one of the digits in the programmed sequence.

Figure 8B:
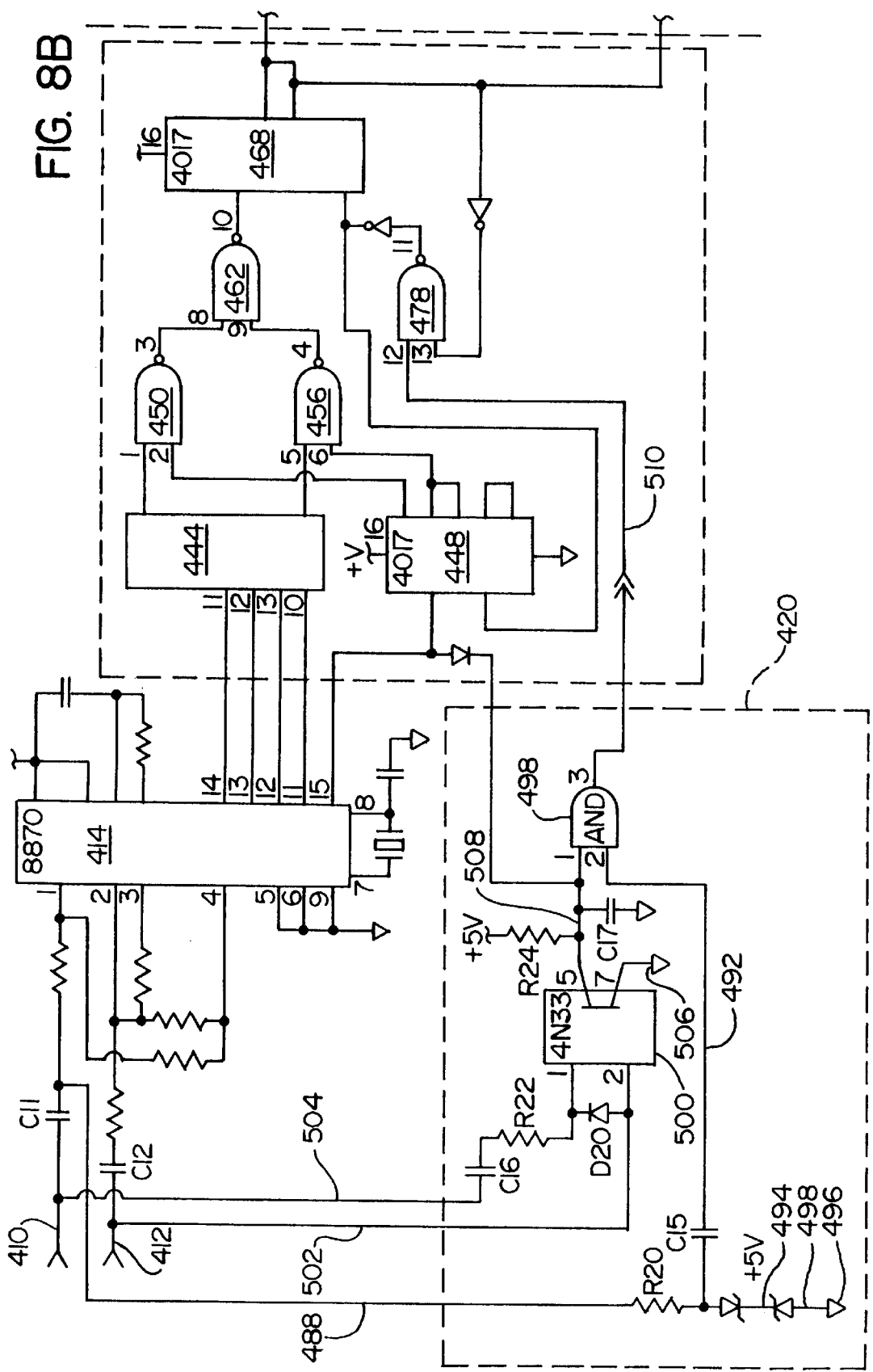
FIG. 8B shows a circuit diagram which is essentially similar to that of FIG. 8A, but which incorporates the off-hook detect and ring detect sections of FIG. 7B in place of the dial tone detect section.

The circuit which is shown in FIG. 8B is identical to that of FIG. 8A, except that the initiate section is provided by the combination ring off-hook detection circuit. In overview, the operation of this circuit is to enable the logic circuit if the phone is picked up to make an outgoing call, but not enable the logic circuit in response to an incoming call. Thus, if there is detection of the "ring" signal prior to detection of the "off-hook" signal, the logic circuit will not be enabled.

The "ring" signal in telephone systems is a high-frequency, high-voltage (approximately 90 volts) signal which is transmitted across the phone lines from the receiving station. The "off-hook" signal, in turn, is represented by a relatively large voltage drop (from approximately 50 volts down to approximately 5–10 volts) which occurs when the receiver is lifted from its hook.

The primary components of the enablement section are resistor R20 and capacitor C15. The resistor-capacitor combination acts essentially as a high-frequency filter: DC voltage is supplied to the resistor-cap combination via lead 488, and in response to the sudden voltage drop (e.g., 50 volts down to 5 volts), the combination outputs a pulse to pin 2 of the AND gate 490, via lead 492. A zener diode pair 494 is connected to ground 496 in lead 498, between resistor R20 and C15, so as to prevent false triggering from the dial tone.

The ring-detect portion of the circuit, in turn, employs a 4N33 dial tone detector IC, as indicated by reference numeral 500, which is connected across the phone lines 410, 412 by leads 502, 504. A capacitor C16 in lead 504 prevents the high-voltage AC "ring" signal from intruding into the DC circuit, and resistor R22 drops the voltage down to the desired level.

A diode D20 bridges pins 1 and 2 of the 4N33 chip, so as to limit the reverse voltage (the "ring" signal flows both directions). Internally, the 4N33 is provided with an LED which is actuated by the "ring" signal voltage which is applied across pins 1 and 2, and an LED-activated transistor which is connected across pins 5 and 4. The transistor is an open collector type, and pin 4 is connected to ground at 506. Thus, when the LED is activated by the "ring" signal, pin 5 and the lead 508 which connected essentially thereto are grounded and "pulled" down to "0", positive voltage being supplied to the lead via resistor R24 in order to keep it in the "high" condition prior to this. The "low" or "0" condition is supplied to pin 1 of AND gate 490. Because the "off-hook" signal normally follows the ring signal by a short period of time (as the person picks up the phone), a capacitor C17 is connected between lead 508 and ground to hold the "0" condition for a period of which is sufficient for the signal from the off-hook section of the circuit to be received at pin 2 of the AND gate.

Operation of the ring-detect circuit is as follows: the incoming ring signal on lines 410–412 and leads 502, 504 activates the internal LED of IC 500. This, in turn, activates the internal transistor, which "grounds out" the circuit between pins 5 and 4 and pulls pin 1 of AND gate 490 down to a "0" condition. Then, as the person picks up the phone, the off-hook pulse is received at pin 2 of the AND gate, via resistor-capacitor combination R20-C15. The "0" at pin 1 and the "1" of pin 2 produce a "0" at pin 3 of AND gate 490, and this output is supplied via lead 510 to pin 1 of NAND gate 478. At the same time, a "high" condition or "1" is supplied to pin 2 of the NAND gate through lead 512 and inverter 514, so that the output of pin 3 is a "1" pulse which is provided to pins 15 of the two decade counters 488, 468 of the logic circuit. Thus, if a "ring" signal precedes the "off-hook" signal, the logic circuit will not be enabled, obviating the possibility of someone who has called in then being able to dial "911" to activate the flasher circuit. On the other hand, if a person picks up the phone to make an outgoing emergency call, the "off-hook" signal will not be preceded by a "ring" signal. In this case, pin 1 of AND gate 490 will remain in a "1" condition and pin 2 will receive the "1" pulse, producing a "1" at pin 3 of AND gate 490 and pin 1 of NAND gate 478. Thus, both pins 1 and 2 of the NAND gate will receive a "1" pulse, so that pin 3 of the NAND gate will be forced to a "0" condition, causing the invertor to be a "1" condition. Since in this sequence the NAND gate 478 does output a "0" pulse, the logic circuit is initiated by dialing of the digits "9-1-1" or other designated emergency number. The logic sequence described above is summarized in the State Diagram which is provided in FIG. 9.

Up to this point, the description has focussed on embodiments which are specifically configured for the purpose of flashing a porch light or similar fixture to draw the attention of emergency response personnel. However, it will be understood that, in various embodiments, the present invention may be employed to provide for inexpensive phone-activation and other features and/or electrical loads (e.g, appliances). Furthermore, these and the previously described embodiments of the present invention may be provided with a microcontroller to interpret one or more sequences of digit tones and provide predetermined control functions in response thereto. In all such embodiments, the power may preferably be supplied from the "cycle stealing" power network which was described above, although in some embodiments it may be suitable to provide power by means of a dedicated 110 VAC lead or "third wire".

Figure 10:
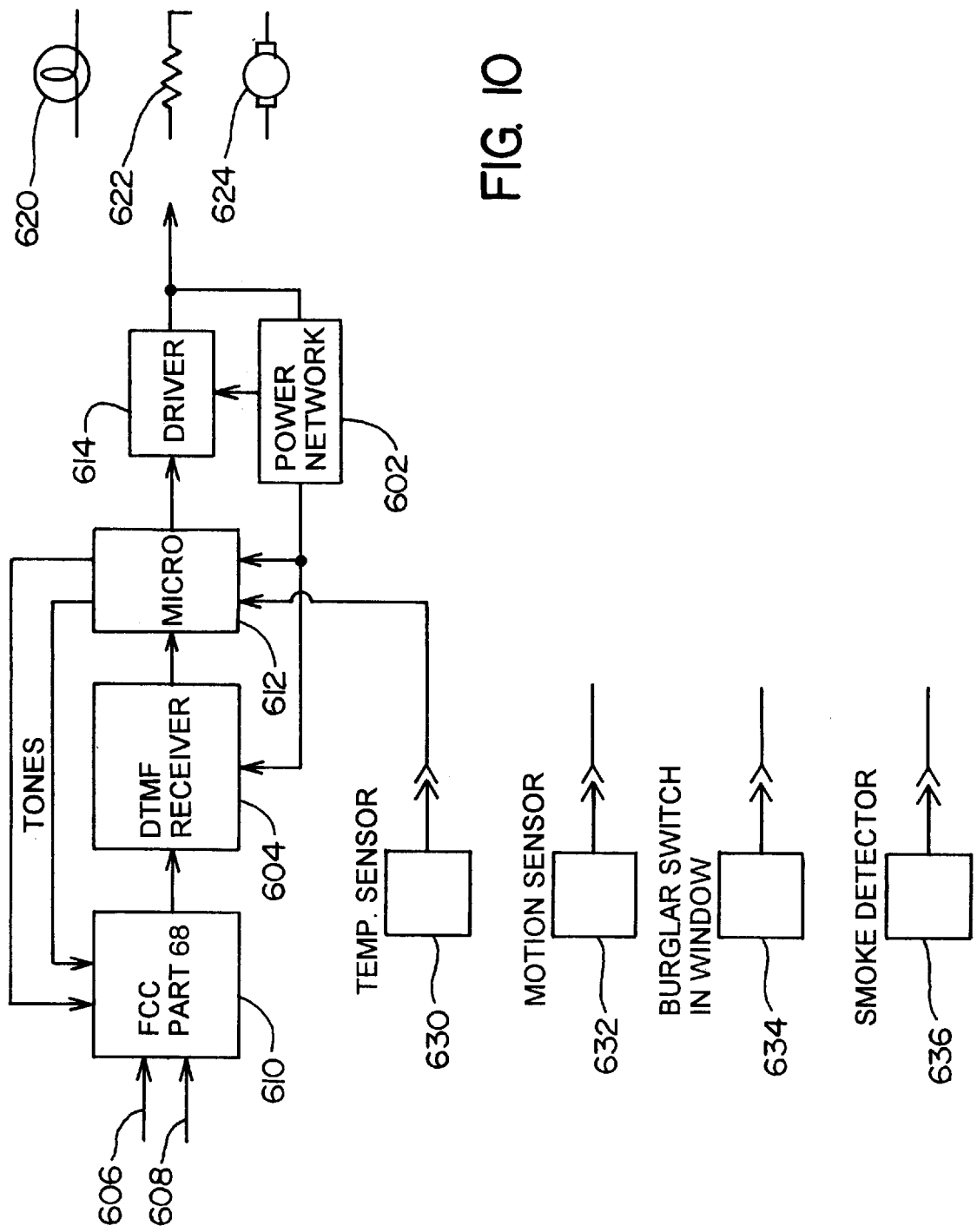
FIG. 10 is a block diagram similar to FIGS. 7A, 7B, showing an embodiment of the circuit which incorporates microprocessor in the logic section.

FIG. 10 provides a block diagram 600 of such embodiments of the present invention. A DTMF receiver/decoder 604, as described above, is connected across the phone lines 606, 608, with the interface between the two being protected by circuitry in accordance with FCC part 68, as indicated by reference numeral 610. The binary output of the DTMF receiver/decoder is supplied to the microcontroller section 612 which, in turn, activates the driver network 614, as was also described above. The driver network, in turn, activates the 110 VAC load in accordance with the commands received from the microcontroller; the electrical load may be a light or lights as described above, or may be a heater, motor, appliance, or other electrical load. Power is supplied to the DTMF decoder/receiver, microcontroller, and driver sections from the power network section 616 which is connected across the 110 VAC leads, as has been described above.

Thus, by dialing a predetermined sequence of digits, either on a co-located telephone or on a distant station, the person can instruct the microcontroller to activate the desired electrical load in a predetermined and/or selected mode. Moreover, as is shown in FIG. 10, the command may be supplied to the microcontroller from a local or remote sensor, such as a temperature sensor 630, motion sensor 632, burglary sensor window switch 634, smoke detector 636, and so forth. For example, the system may be configured to sound an alarm and/or provide a signal to emergency response personnel in response to temperature/smoke sensor inputs indicating a fire, or in response to motion sensor/burglar switch inputs indicating an unauthorized intrusion.

Figure 11:
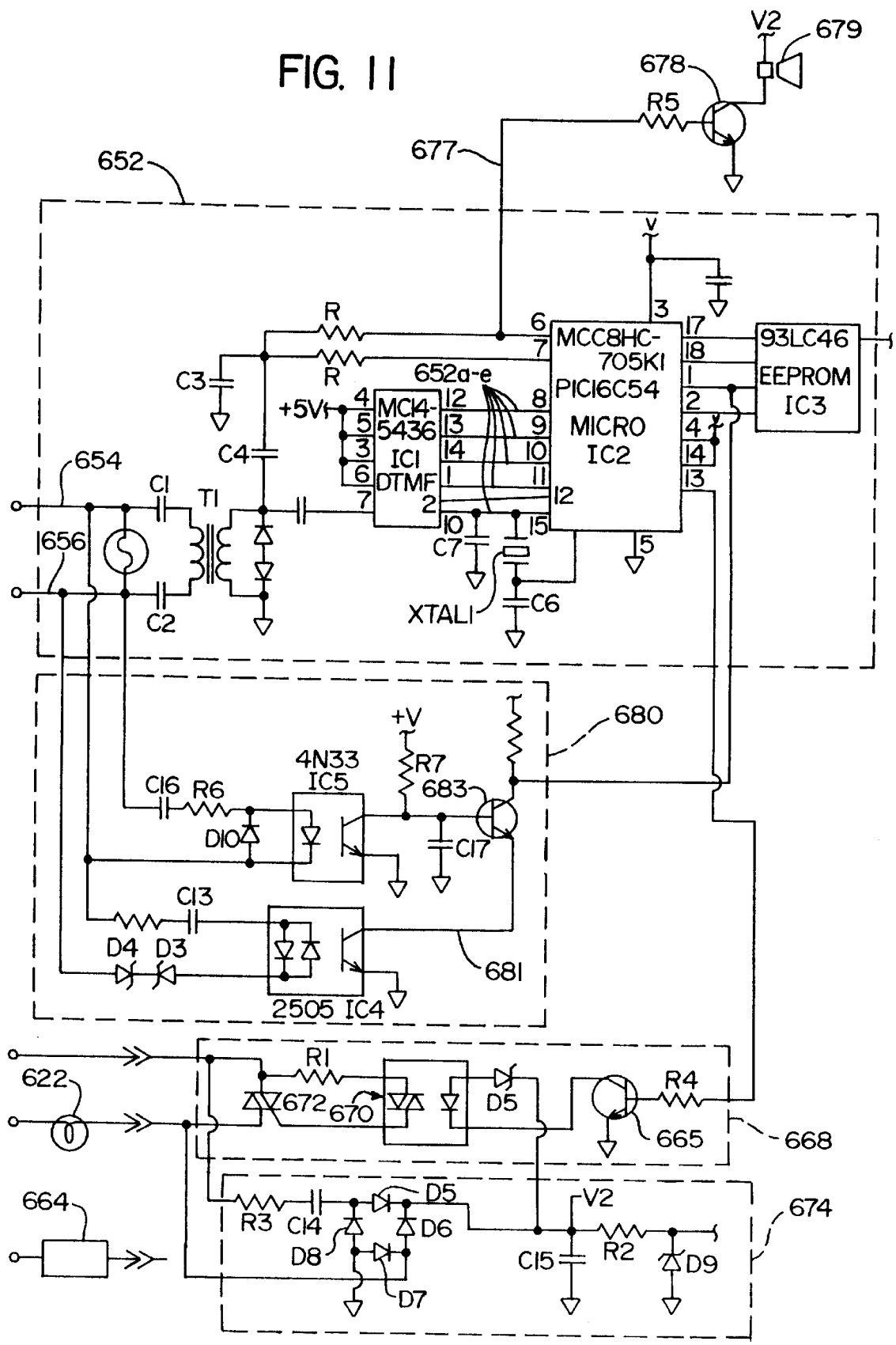
FIG. 11 is a circuit diagram implementing the block diagram of FIG. 10.

FIG. 11 shows a circuit diagram of an embodiment of the present invention which implements the block diagram of FIG. 10. As before, power is supplied from a converter network which is essentially identical to that described above, and which will therefore not be discussed here.

As was noted above, the circuit 650 incorporates a microcontroller for interpreting and implementing the telephone tones and/or other inputs. In the particular embodiment which is illustrated, this employs the microcontroller in a logic circuit 652 which is essentially similar to logic circuits which are used in certain telephone call restrictor devices (e.g., Weeder Technologies, part number WT-TCR-C) and therefore does not form a part of the invention in and of itself, its operation being described here for the purpose of providing the reader with an understanding of the invention as a whole. A PAL array may also be employed to provide suitable logic for the circuit.

The logic circuit 652 is connected across the two phone lines 654, 656 and capacitors C1 and C2 and transformer T1 serve to isolate the circuit from the phone lines. These components also couple the DTMF (Dual-Tone Multiple Frequency) from the phone lines to pin 7 of IC1, which in this embodiment may be an MC145436 (Motorola) DTMF receiver. A metal-oxide varistor MOV1 protects the circuit from high voltage spikes on the phone line, and diodes D1 and D2 provide protection from ringer voltages.

As was described above, the DTMF receiver IC1 converts the touch tones into 4-bit TTL-level data. The microcontroller IC2, which may be, for example, a PIC16C54 or MMCC8HC705K1 (Motorola) microcontroller, processes the data from IC1; furthermore, in those embodiments which are configured for programmability by the user, the microcontroller stores user entered numbers in an EEPROM IC3.

Crystal XSTAL 1 is connected between pins 15 and 16 of IC2 to provide a reference frequency, pin 16 also being connected to ground through capacitor C6. Also, 657e between IC1 and IC2 is connected to ground through capacitor C7.

In the embodiment which is illustrated, the circuit is configured to be able to operate in a call-restrictor mode (e.g., to block outgoing "1-900-" calls), in which the microcontroller generates dual tones on leads 658, 660, which are combined at nodes 662, 664, so as to provide a "busy tone" which is imposed on the phone line and causes the central office to prevent any further dialing; the disable tones are attenuated by resistors R1 and R2, smoothed out by filter capacitor C3, and then coupled to T1 by capacitor C4.

The PLC16C54 is an 8-bit C-moss controller manufactured by Microchip Technology Inc. The internal RAM of the PIC16C54 functions as working registers for the operating program. Optionally, user-entered data is stored in IC3 (for example, a 93LC461K serial EEPROM, also manufactured by Microchip). The EEPROM IC3 is connected to port A of IC2, through four input lines: (A1–A4): "chip select", "clock", "data in" and "data out". After a "high" is detected on "chip select", data is transferred to and from the EEPROM on the positive transition of the clock signal. The data in the EEPROM is stored in 16-bit blocks, while the data output from the DTMF receiver/decoder is in 4-bits. To make use of all of the memory available in the EEPROM, the microcontroller's software is written so that it will stack four numbers at the same address locations when storing the members in the EEPROM, then extract the numbers in the correct order when reading back from the EEPROM.

After IC2 resets, which occurs when the phone is taken off-hook, the chip looks for a number entered from the telephone. The IC2 may be "hard programmed" to respond to the particular sequence, or (in programmable embodiments) stores the number in one of its registers and then looks for a match in the EEPROM IC3. For example, in an embodiment which is configured for "call blocking", if the appropriate match is found in the EEPROM, the microcontroller produces tones on leads 658, 660 which render it impossible to complete the call. Similarly, codes (either hard programmed in the microcontroller or user-entered in the optional EEPROM) can be provided for energizing a lamp 662 or any other electrical load 664.

For example, if the sequence ("9-1-1") or other designated emergency telephone number is dialed, the microcontroller initiates the "flash mode" of the circuit 650 by cyclically placing pin B6 in the "high" condition, which energizes transistor 665. This permits current to flow from the convertor network to ground, through lead 667 and transistor 665, which cyclically activates the triac/triac driver portion 668 of the circuit; in short, the microcontroller takes the place of 555 timer 111 which was described with regard to FIG. 4.

The triac driver/triac circuit 668 is essentially similar to the corresponding sections described above with regard to FIG. 4 and, for example, comprises an optolisolator 670 (which corresponds to optolisolator 120 in FIG. 4) triac 672 (triac 94 in FIG. 4), resistor R1 (R5 in FIG. 4), and zener diode D5 (D7 in FIG. 4). Power is supplied to the triac driver/triac circuit from the power supply converter network 674, which is substantially similar to that which has been described above and comprises the following components, with the corresponding components in FIG. 4 being indicated in parentheses: diode combination D5–D8 (D1–D4), capacitor C14 (C1), capacitor C15 (capacitor C2), capacitor C16 (C2), and resistor R2 (R4), and zener diode D9 (D7). Resistors R3 and R4 limit voltage to the desired level.

Accordingly, current flow to pin B6 of IC2 causes cyclic actuation of triac 672, causing light 662 to flash as on and off in the emergency mode. Simultaneously, this causes pin 6 of the microcontroller to output a "high" which is supplied, via lead 677 and limit resistor R5, to transistor 678. This actuates the transistor, so that current flows therethrough from V2 (from the converter network) to ground, energizing the piezoelectric alarm 679.

On the other hand, if the sequence which is dialed calls for continuous operation of the appliance 664 or other load, the microcontroller IC2 holds pin B6 in the "high" condition continuously (or for a previously determined period of time), so that the triac 672 is held closed to permit continuous flow through the 110 VAC circuit.

The microprossor IC2/EEPROM IC3 can be programmed to provide a number of other functions. For example, the microcontroller can be programmed to actuate the triac driver/triac circuit 668 on a random basis; this permits the lights in a dwelling or other appliances/loads to be energized on a random basis in order to deter burglars. As was noted above, the circuit 650 may be employed to energize virtually any motor, appliance or other load; just a few examples of such loads include the following: heating systems, air conditioning systems, ventilation fans, audio/video entertainment systems, pumps, kitchen appliances. Furthermore, as was also noted above, the programmed input may be provided by an automated sensor (e.g., a smoke detector, temperature sensor, motion sensor, window switch, etc.), and the microcontroller/EEPROM can be programmed to energize the corresponding load (e.g., alarms, lights, etc.). Still further, the microprocessor can be programmed to transmit touch tones across phone lines 654, 656, essentially "contacting" the owner or police/emergency personnel in response to an actuation by the sensor; in the embodiment which is illustrated, the signal is generated on leads 658, 660 to block dialing, but the microprossor IC2/EEPROM IC3 can be programmed to generate the appropriate tones to "dial out" across lines 654, 656.

Circuit 650 is also provided with a ring/off-hook detect circuit 680 which initiates the logic circuit. This is similar in construction and operation to the corresponding portions of the circuit which was described with regard to FIG. 8B. In particular, the ring-detect circuit comprises a capacitor C16, resistor R6, diode D10, 4N33 IC chip, IC5, resistor R7, and capacitor C17. The off-hook detect function, in turn, is provided by the following: Optoisolator IC4 generates a reset pulse for the microcontroller every time the hand set is picked up or put back on-hook; the change in voltage causes current to flow through the optoisolator as capacitor C13 chargers or discharges to the new voltage level. The current flow actuates the transistor output of IC4, enabling current to flow from lead 681 therethrough to ground. Thus, a ring signal essentially grounds out lead 682, providing a "0" to NPN transistor 683, so that the transistor remains open and current is unable to flow through lead 681 in response to a subsequent "off-hook" signal. If the person is making an outgoing call and the 4N33 IC5 does not receive a ring signal, lead 682 remains in a "high" state, so that current is able to flow through the transistor to ground when the 2505 IC4 receives the off-hook signal, thus pulling IC2's reset pin 18 low and enabling the microcontroller. Dual diodes D3 and D4 provide a threshold voltage that is high enough so that voice or DTMF tones will not trigger a reset.

FIGS. 15A and 15B are perspective views showing first and second embodiments of switches and switch enclosures which house the circuitry of the present invention, and the manner in which these may be mounted in the wall of a house or other building. In particular, FIG. 12A shows a dedicated switch unit 700 which encloses essentially all of the components of the circuit, with the exception of the external 110 VAC load. The switch housing 702 is sized and configured for mounting in a conventionally-sized switch junction box 704; the external configuration of junction box 704 is substantially identical to that of switch boxes which are conventionally used for light switches and similar controls. A telephone-jack lug 706 protrudes from one side of the switch enclosure 702 and through a corresponding opening 707 in the wall of switch box 704, and this receives a conventional male telephone-jack plug 708 which is connected at the end of phone leads 710a, 710b; by positioning the connection for the phone lines outside of the junction box, the device satisfies regulatory requirements which prohibit housing both 110 VAC leads and telephone leads in the same enclosure.

The 110 VAC leads 712a, 712b extend from their connections on the switch housing 702 and are routed through openings (not shown) in junction box 704 in a conventional manner. A two-throw, "on-off" toggle 714 is provided at the face of switch 700, a three position switch not being needed in these embodiments inasmuch as the signal for initiating the "flash" or other sequence is supplied via the phone lines rather than by manual operation of the switch. However, as was described above, a service switch 716 (e.g., a two-position slider switch) is provided at the face of switch 700 to enable all power to the AC load to be secured while the bulb is being changed or other maintenance is being performed.

The embodiment illustrated in FIG. 12B contrasts with that of FIG. 12A in that the switch 718 is a conventional on-off switch, and the power converter, logic, driver, and other portions of the circuit are housed in an enclosure 720 which is formed integrally with the junction box 722. One of the two 110 VAC leads—724a—is routed through the control box at I/O junctions 726a, 726b, and then through the electrical load 728 to the second 110 VAC lead 724b. Internally, lead 724a is connected across the poles of switch 718 by leads 730a, 730b, which pass from the control enclosure 720 into the interior of junction box 722. A female receptical 732 is also provided on the exterior of the control enclosure 720 to receive the male connection 734 on the end of phone leads 736a, 736b.

Thus, the embodiment of FIG. 12A uses standardized junction boxes and dedicated switch assemblies 700, whereas that of FIG. 12B uses conventional switch units 718 and junction boxes 722 which are particularly configured to incorporate the control circuitry. An advantage of the former (FIG. 12A) is that the switches 700 can readily be retrofitted in an existing structure, and at those specific locations where a control function is desired (e.g., for flashing a porch light or energizing a particular appliance). The second configuration (i.e., FIG. 12B), in turn, presents certain advantages for new construction installations. In particular, the junction boxes 722 which incorporate the control circuitry can be mounted on a "universal" basis throughout the house or other structure. Then, by programming the various boxes 722 with the different code sequences, the associated electrical loads 728 can be controlled throughout the house from a single telephone. In short, this enables the owner to use the telephone to control various lights, appliances, sensors and so forth at remote locations by simply using the telephone, whereas the only way this has generally been done in the past has been through the use of a PC or similar computer system running dedicated software.

The invention may be embodied in other specific forms without departing from the spirit or essential characteristics thereof. For example, being that the circuit incorporating the present invention makes it possible to flash the light fixture at virtually any desired duty cycle and for any duration, this may be used for many applications in addition to providing an emergency signal, such as for turning interior lights on-and-off for much longer periods to deter burglars. The present embodiments are therefore to be considered in all respects as illustrative and not restrictive, the scope of the invention being indicated by the appended claims rather than by the foregoing description.

What is claimed and desired to be secured by Letters Patent of the United States is:

1. Apparatus for energizing a high-voltage AC electrical load in response to a telephone signal, comprising:

electrical switch means configured to be mounted within a switch junction box in first and second high-voltage AC current leads for controlling the flow of high-voltage AC line current from said switch means through said first and second leads to said high-voltage AC electrical load;

control means configured to be mounted to said junction box for selectively actuating said electrical switch means so as to supply said high-voltage AC line current to said load in response to said telephone signal; and attachment means for connecting said control means to a telephone line on which said telephone signal is transmitted.

2. The apparatus of claim 1 wherein said control means comprises:

a main relay connected in said first lead so as to permit flow of said high-voltage AC current through said first lead in response to activation of said relay by a gate current pulse, said relay being configured to remain actuated after termination of said gate current pulse so long as a predetermined minimum current is flowing through said first lead;

means for providing said gate current pulse to said relay at the beginning of each half cycle of said high-voltage AC current, said means for providing said pulse being connected to said first lead in parallel with said main relay so as to be grounded out by actuation of said main relay, so that said pulse is terminated by actuation of said main relay and the remainder of said half cycle of said high-voltage AC current flows through said relay to said electrical load, and so that said main relay remains actuated until said AC current drops below said minimum at the end of said half cycle; and timer means for enabling said gate current pulses to flow to said main relay at the beginning of each half-cycle of said AC current for a predetermined period of time, so that said main relay is actuated so as to energize said electrical load for said predetermined period of time.

3. The apparatus of claim 2, wherein said means for providing said gate current pulse to said main relay at the beginning of each half cycle of said high-voltage AC current comprises a relay driver for initiating said gate current pulse in response to receiving a pulse of a predetermined relatively low-voltage control current.

4. The apparatus of claim 3, further comprising voltage-reduction means connected to said first lead in parallel with said main relay for reducing said high-voltage AC current to said relatively low-voltage control current which is received by said relay driver.

5. The apparatus of claim 4, wherein said voltage-reduction means is a capacitor having a current lead effect which permits said predetermined low-voltage control current to flow through said capacitor to said relay driver at said beginning of each said half cycle prior to the voltage of said AC current exceeding a predetermined maximum voltage, said predetermined maximum voltage being significantly less than a voltage which would be required to obtain said predetermined low voltage control current from said high-voltage AC current in the absence of said current lead effect.

6. The apparatus of claim 5, wherein said timing means comprises a 555 IC timer configured to operate in an astable mode.

7. The apparatus of claim 6, further comprising a convertor network for converting said current flowing through said capacitor from low-voltage AC current to low-voltage DC current.

8. The apparatus of claim 7, wherein said convertor network is a diode array.

9. The apparatus of claim 8, further comprising a second capacitor, said second capacitor being connected across first and second output leads of said diode array for storing a portion of the energy of each said pulse of low-voltage current which flows through said first capacitor, said second capacitor further being connected across the supply voltage and ground pins of said 555 IC timer for supplying said stored energy to said 555 IC timer so as to operate said timer.

10. The apparatus of claim 6, wherein said main relay is a primary triac.

11. The apparatus of claim 10, wherein said relay driver comprises an optoisolator having an internal LED which is actuated by each said control current pulse which flows to said optoisolator at the beginning of a said half-cycle of said AC current, and an internal triac which is actuated in response to actuation of said LED, said internal triac being connected to said primary triac so as to provide said gate current pulse thereto in response to each actuation of said internal triac.

12. The apparatus of claim 1, wherein said control means comprises:
 decoder means for converting telephone signals to corresponding electronic signals; and
 logic means connected to said decoder means for selectively actuating said switch means in response to receipt of a specific electronic signal having a predetermined structure.

13. The apparatus of claim 12, wherein said telephone signals are touch tone signals, and said decoder means comprises a Dual Tone Multiple Frequency decoder.

14. The apparatus of claim 13, wherein said telephone signal comprises a series of touch tone signals representing a dialed numerical sequence.

15. The apparatus of claim 14, wherein said electronic signal having said predetermined characteristics corresponds to dialed numerical sequence which represents a designated emergency telephone number.

16. The apparatus of claim 15, wherein said electrical load comprises:
 alarm means for drawing attention of emergency response personnel to a structure in which said apparatus is located.

17. The apparatus of claim 16, wherein said alarm means for drawing attention of emergency response personnel comprises:
 a high-voltage AC exterior light fixture of said structure.

18. The apparatus of claim 16, wherein said control means further comprises:
 initiation means for enabling said logic means only in response to an outgoing telephone call, so as to prevent unauthorized actuation of said alarm means by a person telephoning in from outside said structure.

19. The apparatus of claim 18, wherein said initiation means comprises:
 means for detecting a dial tone on said telephone line and initiating said logic means in response to detection thereof.

20. The apparatus of claim 18, wherein said initiation means comprises:
 means for detecting a sequence of (a) a ring signal and (b) an off-hook signal on said telephone line and initiating said logic means in response to detection of said off-hook signal only in the absence of detection of said ring signal.

21. The apparatus of claim 17, wherein said logic means comprises:
 means for cyclically energizing and de-energizing said exterior light fixture in a "flash" mode in response to dialing of said designated emergency telephone number on said telephone line.

22. The apparatus of claim 21, wherein said electrical switch means has an "on" position and an "off" position, and said control means is configured to energize said exterior light fixture in said "flash" mode in response to dialing of said designated emergency telephone number on said telephone line regardless of whether said switch is in said "on" position or said "off" position.

23. The apparatus of claim 12, wherein said logic means comprises
 a microcontroller for receiving a binary sequence which is outputted by said Dual Tone Multiple Frequency decoder in response to receipt of a touch tone signal representing a dialed number.

24. The apparatus of claim 23, wherein said microcontroller is programmed to energize said electrical load in response to receipt of a series of binary code sequences which correspond to at least one predetermined dialed telephone number.

25. The apparatus of claim 24, wherein said electrical load comprises:
 a plurality of separate electrical loads, said microcontroller being programmed to energize said electrical loads individually in response to receipt of code sequences corresponding to dialed telephone numbers which are separately associated with said loads by said microcontroller.

26. The apparatus of claim 1, further comprising:
 sensor means for generating said telephone signal on said telephone line in response to the presence of a predetermined environmental condition.

27. A telephone-controlled actuation apparatus comprising:
 electrically-powered actuation means configured to be mounted within a switch junction box of a high-voltage AC circuit having first and second leads; and
 power supply means configured to be mounted within said junction box for providing low-voltage DC electrical power to said actuation means, said power supply means comprising:
 a main relay connected in said first high-voltage AC current so as to permit flow through said first lead in response to activation of said relay by a gate current pulse, said relay being configured to remain actuated after termination of said gate current pulse so long as a predetermined minimum current is flowing through said first lead;
 a relay driver for initiating said gate current pulse to said relay at the beginning of each half cycle of said high-voltage AC current in response to receiving a pulse of a predetermined relatively low voltage control current, said relay driver being connected in said first lead in parallel with said main relay so as to be grounded out by actuation of said main relay, so that said pulse is terminated by actuation of said main relay and the remainder of said half cycle of said high-voltage AC current flows through said relay to an electrical lead, and so that said main relay remains actuated until said AC current drops below said minimum at the end of said half cycle;

said capacitor selectively connectable to said first lead in parallel with said main relay for reducing said high voltage AC current to said relatively low voltage control current which is received by said relay driver, said capacitor having a current lead effect which permits said predetermined low-voltage control current to flow through said capacitor to said relay driver at said beginning of each said half cycle prior to the voltage of said AC current exceeding a predetermined maximum voltage, said predetermined maximum voltage being significantly less than a voltage which would be required to obtain said predetermined low voltage control current from said high-voltage AC current in the absence of said current lead effect; and a convertor network for converting said current flowing through said capacitor from low-voltage AC current to low-voltage DC current which is supplied to said actuation means.

28. The apparatus of claim 27, wherein said convertor network is a diode array.

29. The apparatus of claim 28, further comprising a second capacitor, said second capacitor being connected across first and second output leads of said diode array for storing a portion of the energy of each said pulse of low-voltage current which flows through said first capacitor, said second capacitor further being connected across the supply voltage and ground connections of said actuation means for supplying said stored energy to operate said actuation means.

30. The apparatus of claim 27, wherein said main relay is a primary triac.

31. The apparatus of claim 30, wherein said relay driver comprises an optoisolator having an internal LED which is actuated by each said control current pulse which flows to said optoisolator at the beginning of a said half-cycle of said AC current, and an internal triac which is actuated in response to actuation of said LED, said internal triac being connected to said primary triac so as to provide a said gate current pulse thereto in response to each actuation of said internal triac.

* * * * *